(12) United States Patent
Fujino

(10) Patent No.: US 7,457,925 B2
(45) Date of Patent: Nov. 25, 2008

(54) STORAGE CONTROL METHOD AND SYSTEM

(75) Inventor: Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 11/165,271

(22) Filed: Jun. 24, 2005

(65) Prior Publication Data

US 2006/0218369 A1      Sep. 28, 2006

(30) Foreign Application Priority Data

Mar. 22, 2005   (JP)   ............................. 2005-081455

(51) Int. Cl.
*G06F 12/02* (2006.01)
(52) U.S. Cl. .................. 711/154; 711/162; 711/170
(58) Field of Classification Search .................. 711/154
See application file for complete search history.

(56) References Cited

U.S. PATENT DOCUMENTS 6,937,569 B1 * 8/2005 Sarkar et al. ................. 370/238

2002/0087611 A1 * 7/2002 Tanaka et al. .................. 709/1
2004/0172574 A1 * 9/2004 Wing et al. ..................... 714/4
2004/0199526 A1 * 10/2004 Nishikawa et al. .......... 707/100
2005/0235288 A1 * 10/2005 Yamakabe et al. .......... 718/100
2006/0195715 A1 * 8/2006 Herington ...................... 714/4

FOREIGN PATENT DOCUMENTS

JP      2005-55963      3/2005

* cited by examiner

*Primary Examiner*—Matt Kim
*Assistant Examiner*—Michael C Krofcheck
(74) *Attorney, Agent, or Firm*—Mattingly, Stanger, Malur & Brundidge, P.C.

(57) ABSTRACT

To enable favorable control of the storage of electronic information, a management device connected communicably to one or more storage control devices that are connected communicably to at least one of a plurality of storage devices refers to resource information relating to the usage condition of at least one hardware resource from among the one or more storage control devices, specifies an unused part of the hardware resource from the resource information, and sets a storage virtual computer, which serves as a virtual computer to which all or a part of the specified unused part is allocated, in at least one of the one or more storage control devices.

7 Claims, 20 Drawing Sheets

| NO. | AP NAME | PERFORMANCE REQUIREMENT | REQUIRED STORAGE CAPACITY | DISASTER PRESENCE | COPYING PRESENCE | CLUSTERING PRESENCE | STORAGE PRESENCE |
|---|---|---|---|---|---|---|---|
| 1 | AP4A | HIGH | 0.8TB | PRESENT | PRESENT | PRESENT | PRESENT |
| 2 | AP4B-1 | MEDIUM | 0.3TB | ABSENT | PRESENT | PRESENT | ABSENT |
| 3 | AP4B-2 | MEDIUM | 0.3TB | ABSENT | PRESENT | PRESENT | ABSENT |
| 4 | AP4C | LOW | 1.0TB | ABSENT | PRESENT | ABSENT | PRESENT |
| : | : | : | : | : | : | : | : |

FIG. 5A

| | |
|---|---|
| COMBINATION INFORMATION | ~81 |
| ST CONFIGURATION INFORMATION | ~82 |
| VOL CONFIGURATION INFORMATION | ~83 |
| SC INFORMATION | ~84 |
| SC MANAGEMENT INFORMATION | ~85 |
| BC INFORMATION | ~86 |
| MAPPING INFORMATION | ~87 |

| NO. | ST NAME | STORAGE CAPACITY | USED STORAGE CAPACITY | PERFORMANCE |
|---|---|---|---|---|
| 1 | ST39A | 5TB | 3TB | HIGH SPEED |
| 2 | ST39B | 20TB | 10TB | MEDIUM SPEED |
| 3 | ST39C | 80TB | 50TB | LOW SPEED |
| ⋮ | ⋮ | ⋮ | ⋮ | ⋮ |

| NO. | ST NAME | VOL NAME | VOL CAPACITY | USED VOL CAPACITY |
|---|---|---|---|---|
| 1 | ST39A | VOL41A | 2TB | 1TB |
| 2 | ST39A | VOL41B | 1TB | 0.8TB |
| 3 | ST39B | VOL41C | 5TB | 3TB |
| 4 | ST39B | VOL41D | 3TB | 2TB |
| 5 | ST39B | VOL41E | 2TB | 1TB |
| 6 | ST39C | VOL41F | 5TB | 4TB |
| ⋮ | ⋮ | ⋮ | ⋮ | ⋮ |

| NO. | SC NAME | NUMBER OF CONNECTED STORAGES | STORAGE CONTROL INFORMATION |
|---|---|---|---|
| 1 | SC27A | 3 | |
| 2 | SC27B | 2 | |
| ... | ... | ... | |

84

84R

| NO. | ST NAME |
|---|---|
| 1 | ST39A |
| 2 | ST39B |
| 3 | ST39C |

| NO. | ST NAME |
|---|---|
| 1 | ST39D |
| 2 | ST39E |

FIG. 6B

- NUMBER OF LOADED PORTS (=n)
- LOADED PORT INFORMATION
- NUMBER OF LOADED I/Fs (=m)
- LOADED I/F INFORMATION
- NUMBER OF SVCs (=p)
- SVC INFORMATION
- NUMBER OF LOADED CPUs (=e)
- LOADED MEMORY CAPACITY (=f)

| NO. | SVC NAME | PRESENCE OF DETAILED INFORMATION |
|---|---|---|
| 1 | SVC61A | PRESENT |
| 2 | SVC61B | PRESENT |
| ... | ... | ... |
| p | SVC61p | ABSENT |

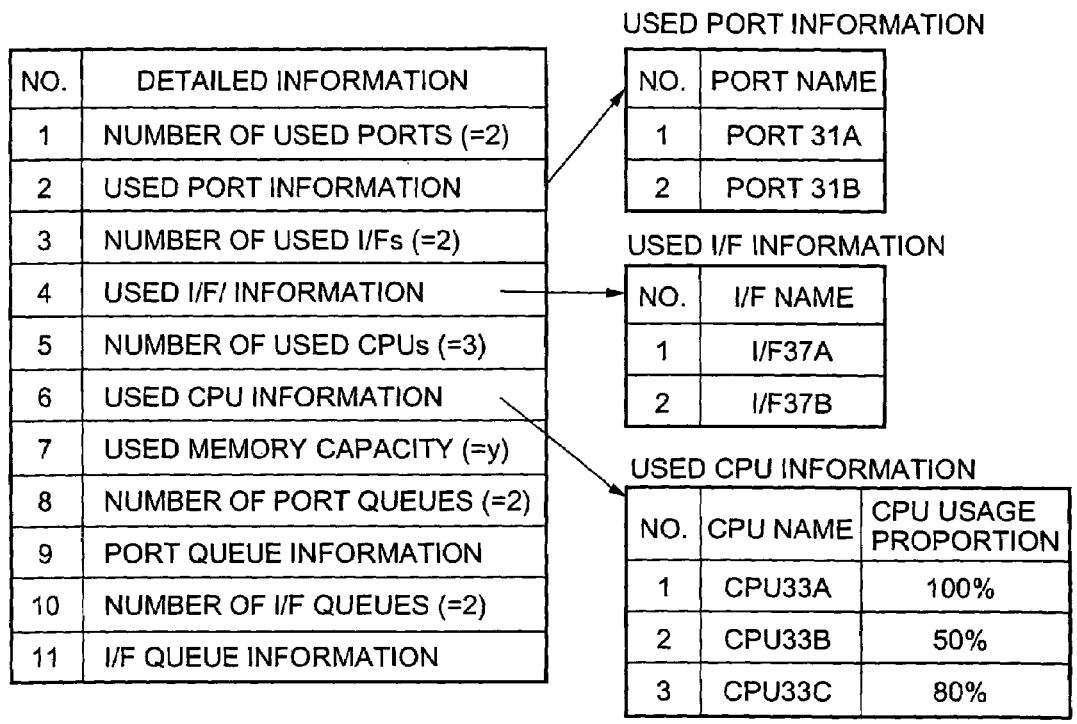

| NO. | DETAILED INFORMATION |
|---|---|
| 1 | NUMBER OF USED PORTS (=2) |
| 2 | USED PORT INFORMATION |
| 3 | NUMBER OF USED I/Fs (=2) |
| 4 | USED I/F/ INFORMATION |
| 5 | NUMBER OF USED CPUs (=3) |
| 6 | USED CPU INFORMATION |
| 7 | USED MEMORY CAPACITY (=y) |
| 8 | NUMBER OF PORT QUEUES (=2) |
| 9 | PORT QUEUE INFORMATION |
| 10 | NUMBER OF I/F QUEUES (=2) |
| 11 | I/F QUEUE INFORMATION |

USED PORT INFORMATION

| NO. | PORT NAME |
|---|---|
| 1 | PORT 31A |
| 2 | PORT 31B |

USED I/F INFORMATION

| NO. | I/F NAME |
|---|---|
| 1 | I/F37A |
| 2 | I/F37B |

USED CPU INFORMATION

| NO. | CPU NAME | CPU USAGE PROPORTION |
|---|---|---|
| 1 | CPU33A | 100% |
| 2 | CPU33B | 50% |
| 3 | CPU33C | 80% |

FIG. 7B

| NO. | VOL NAME | SVC NAME | PORT NAME | I/F NAME |
|---|---|---|---|---|
| 1 | VOL41A | SVC61A | PORT 31A | I/F37A |
| 2 | VOL41A | SVC61A | PORT 31B | I/F37B |
| 3 | VOL41B | SVC61B | PORT 31C | I/F37C |
| : | : | : | : | : |

| NO. | AP NAME | PERFORMANCE REQUIREMENT | REQUIRED STORAGE CAPACITY | DISASTER PRESENCE | COPYING PRESENCE | CLUSTERING PRESENCE | STORAGE PRESENCE |
|---|---|---|---|---|---|---|---|
| 1 | AP4A | HIGH | 0.8TB | PRESENT | PRESENT | PRESENT | PRESENT |
| 2 | AP4B-1 | MEDIUM | 0.3TB | ABSENT | PRESENT | PRESENT | ABSENT |
| 3 | AP4B-2 | MEDIUM | 0.3TB | ABSENT | PRESENT | PRESENT | ABSENT |
| 4 | AP4C | LOW | 1.0TB | ABSENT | PRESENT | ABSENT | PRESENT |
| ⋮ | ⋮ | ⋮ | ⋮ | ⋮ | ⋮ | ⋮ | ⋮ |

FIG. 10B

| NO. | SC NAME | ACCESS DESTINATION PORT NAME | ACCESS SOURCE PORT NAME | VOL NAME |
|---|---|---|---|---|
| . | . | . | . | . |
| . | . | . | . | . |
| . | . | . | . | . |

FIG. 10C

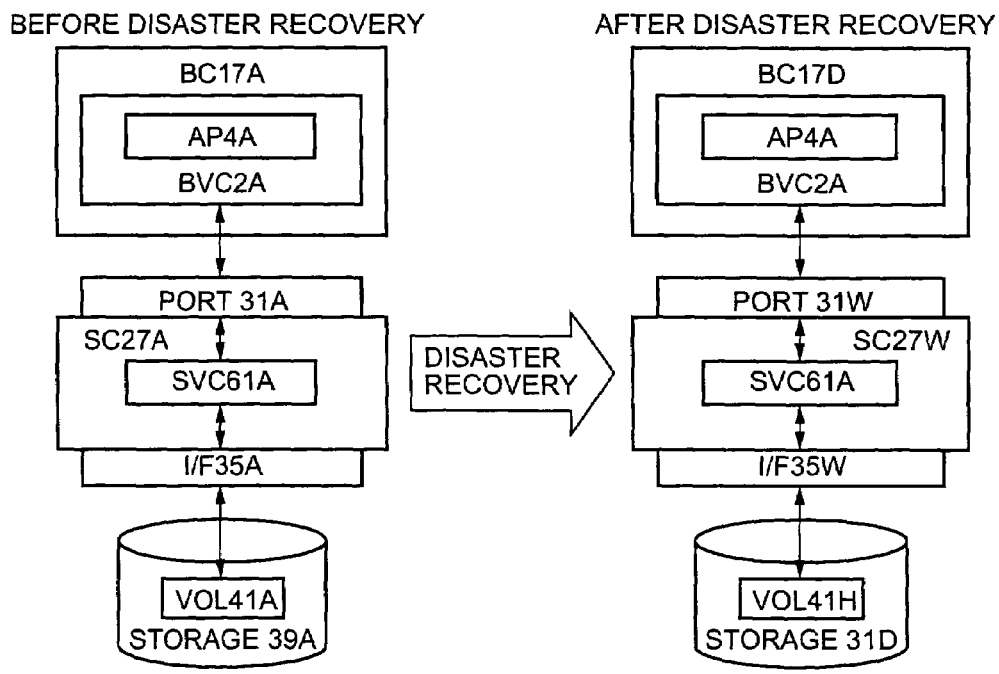

STORAGE CONTROL METHOD AND SYSTEM

CROSS-REFERENCE TO PRIOR APPLICATION

This application relates to and claims priority from Japanese Patent Application No. 2005-081455, filed on Mar. 22, 2005, the entire disclosure of which is incorporated herein by reference.

BACKGROUND OF THE INVENTION

The present invention relates to a technique for controlling the storage of electronic information.

Storage devices which are capable of storing large amounts of electronic information such as data or programs, for example, are known (see Japanese Unexamined Patent Application Publication no. 2005-055963, for example).

However, even when a storage device has a large storage capacity, it is considered undesirable to simply store more and more information in the storage device.

It is therefore an object of the present invention to enable the storage of electronic information to be controlled in a favorable manner.

Other objects of the present invention will become clear from the following description.

BRIEF SUMMARY OF THE INVENTION

A storage control method according to a first aspect of the present invention may comprise the steps of: referring to resource information relating to the usage condition of at least one hardware resource from among one or more storage control devices connected communicably to at least one of a plurality of storage devices; specifying an unused part of the hardware resource from the resource information; and setting a storage virtual computer, which serves as a virtual computer to which all or a part of the specified unused part is allocated, in at least one of the one or more storage control devices.

In this case, for example, the set storage virtual computer may receive an access request from a host device connected communicably to the storage control device, and process the access request by accessing the storage device on the basis of the access request.

In an embodiment, this storage control method may comprise the steps of: specifying combinations of each of the plurality of storage devices and each of a plurality of host devices for accessing at least one of the plurality of storage devices; selecting a combination from one or more combinations comprising a certain host device, and allocating the selected combination to the certain host device; and having a storage virtual computer capable of accessing the storage device included in the allocated combination receive an access request from the certain host device, and access the storage device included in the allocated combination in accordance with the received access request.

In an embodiment, the storage control method may comprise the steps of: referring to host information, which is information expressing a performance level of each host device of the plurality of host devices, and storage device information, which is information expressing a performance level of each storage device of the plurality of storage devices; specifying a plurality of combinations of the host device and storage device on the basis of the performance of each host device and the performance of each storage device, specified from the host information and the storage device information; attaching an order of precedence to each of the plurality of combinations on the basis of the performance of each host device and the performance of each storage device; selecting a combination from one or more combinations comprising a certain host device on the basis of the order of precedence of each of the one or more combinations, and allocating the selected combination to the certain host device; and having a storage virtual computer capable of accessing the storage device included in the allocated combination receive an access request from the certain host device, and access the storage device included in the allocated combination in accordance with the received access request.

In an embodiment, the storage control device may comprise the steps of: gathering host information elements, comprising an ID and the performance level of each host device, from each host device, and generating the host information on the basis of the gathered host information elements; and gathering storage device information elements, comprising an ID and the performance level of each storage device, from each storage control device, and generating the storage device information on the basis of the gathered storage device information elements.

In an embodiment, the storage control method may comprise the steps of: referring to communication path information expressing the length of a communication path between each of the plurality of host devices and each of the plurality of storage devices; specifying, from the communication path information, a communication path length which corresponds to each of the plurality of combinations; and attaching an order of precedence to each of the plurality of combinations on the basis of the performance of each host device, the performance of each storage device, and the specified communication path length of each combination.

In an embodiment, the storage control method may comprise the steps of: attaching a priority value to each of the plurality of combinations on the basis of the order of precedence of each of the plurality of combinations and a weighting value corresponding to the performance level; and selecting a combination from the one or more combinations comprising the certain host device on the basis of the priority value of each of the one or more combinations, and allocating the selected combination to the certain host device.

In an embodiment, the plurality of storage control devices may comprise a first storage control device and a second storage control device. The plurality of storage devices may comprise a first storage connected communicably to the first storage control device, and a second storage connected communicably to the second storage control device. A first storage virtual computer set in the first storage control device may be capable of accessing a first logical volume set in the first storage. In this case, the storage control method may comprise the steps of: moving or copying the first storage virtual computer into the second storage control device; and moving or copying the first logical volume into the second storage.

In an embodiment, a plurality of host devices may be provided for accessing at least one of the plurality of storage devices, and the plurality of host devices may comprise a first host device connected communicably to the first storage control device, and a second host device connected communicably to the second storage control device. The first host device may comprise an information processing portion having at least one of a virtual computer to which all or a part of the hardware resources of the first host device are allocated, and a computer program executed by the virtual computer. The information processing portion may be capable of accessing the first logical volume prior to movement or copying via the first storage virtual computer prior to movement or copying. In this case, the storage control method may comprise the step of moving or copying the information processing portion provided in the first host device into the second host device.

In an embodiment, the storage control method may comprise the step of moving or copying the first storage virtual computer into the second storage control device and moving or copying the first logical volume into the second storage in accordance with predetermined policy information when a predetermined event occurs.

In an embodiment, at least one of a plurality of host devices for accessing at least one of the plurality of storage devices may comprise an information processing portion having at least one of a virtual computer to which all or a part of the hardware resources of the host device are allocated, and a computer program executed by the virtual computer. The storage devices may be constituted by storages. The information processing portion may be capable of accessing a logical volume set in a certain storage via a certain storage virtual computer of a certain storage control device. In this case, the storage control method may comprise the step of neither moving nor copying the logical volume and the certain storage virtual computer, but moving or copying the information processing portion from the host device thereof to another host device.

A device (a management computer to be described below, for example) according to a second aspect of the present invention may be capable of communicating with one or more storage control devices connected communicably to at least one of a plurality of storage devices. The device may comprise: a storage area storing at least one computer program; and at least one computer for reading the at least one computer program from the storage area and executing the computer program. For example, the at least one computer (a computer machine or processor, for example) may realize means for referring to resource information relating to the usage condition of at least one hardware resource from among the one or more storage control devices, means for specifying an unused part of the hardware resource from the resource information, and means for setting a storage virtual computer, which serves as a virtual computer to which all or a part of the specified unused part is allocated, in at least one of the one or more storage control devices. Each of these means may be realized by an object other than a computer.

A storage control system according to a third aspect of the present invention may comprise: one or more storage control devices connected communicably to at least one of a plurality of storage devices; and a management device connected communicably to the one or more storage control devices. The management device may comprise: a storage area storing at least one computer program; and at least one computer for reading the at least one computer program from the storage area and executing the computer program. For example, the at least one computer may realize means for referring to resource information relating to the usage condition of at least one hardware resource from among the one or more storage control devices, means for specifying an unused part of the hardware resource from the resource information, and means for setting a storage virtual computer, which serves as a virtual computer to which all or a part of the specified unused part is allocated, in at least one of the one or more storage control devices. Each of these means may be realized by an object other than a computer.

A computer program according to a fourth aspect of the present invention may cause a computer to execute the steps of: referring to resource information relating to the usage condition of at least one hardware resource from among one or more storage control devices connected communicably to at least one of a plurality of storage devices; specifying an unused part of the hardware resource from the resource information; and setting a storage virtual computer, which serves as a virtual computer to which all or a part of the specified unused part is allocated, in at least one of the one or more storage control devices.

BRIEF DESCRIPTION OF THE DRAWINGS

FIG. 5A shows a constitutional example of configuration information that is constructed in the storage control system shown in the example in FIG. 4B, FIG. 5B shows a constitutional example of ST configuration information 82, and FIG. 5C shows a constitutional example of VOL configuration information 83;

FIG. 6A shows a constitutional example of SC information 84, and FIG. 6B shows a constitutional example of storage control information included in SC information elements 84R;

FIG. 7A shows a constitutional example of detailed information relating to a storage virtual computer 61, and FIG. 7B shows a constitutional example of SC management information 85;

FIG. 10A shows a constitutional example of policy information 13, FIG. 10B shows a constitutional example of management information 703 that can be set in a management computer 5, and FIG. 10C shows an example of the execution of a "disaster recovery" service;

Figure 15A:
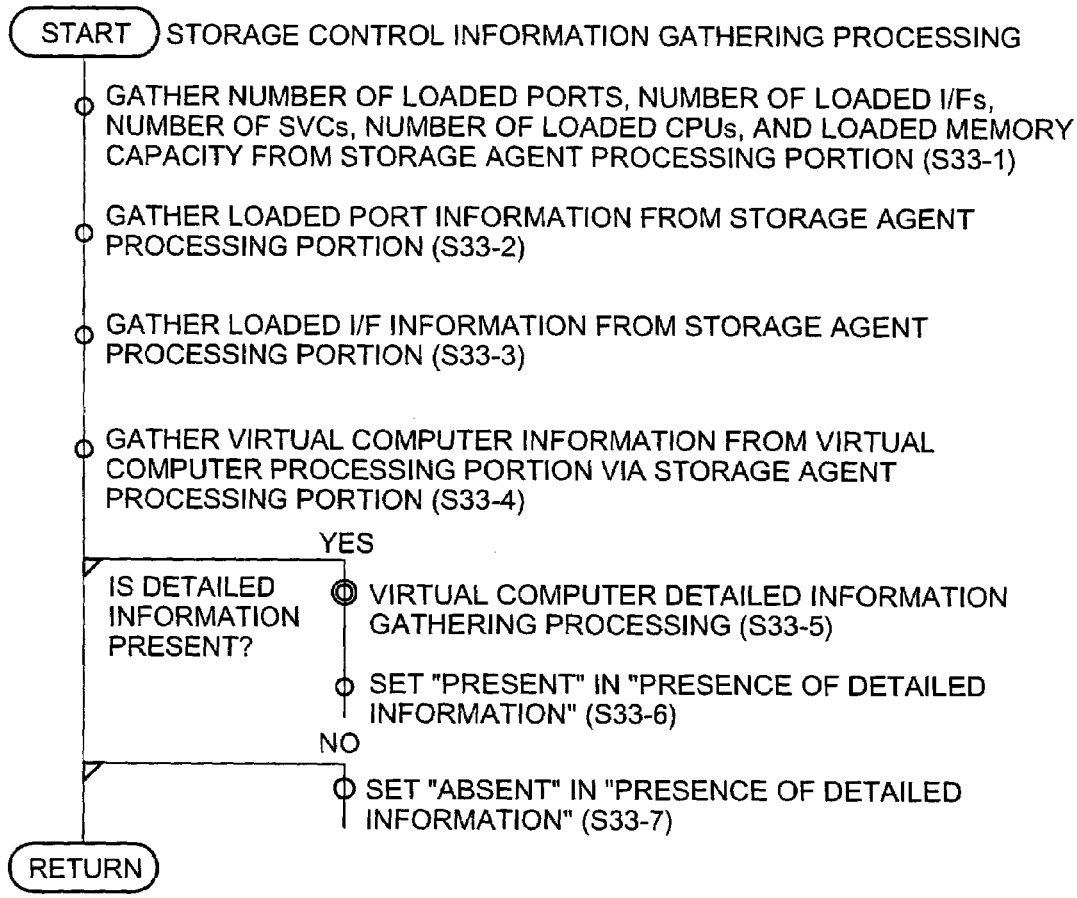
FIG. 15A shows an example of storage control information gathering processing performed in S33 of FIG. 14B, and FIG.
Figure 16:
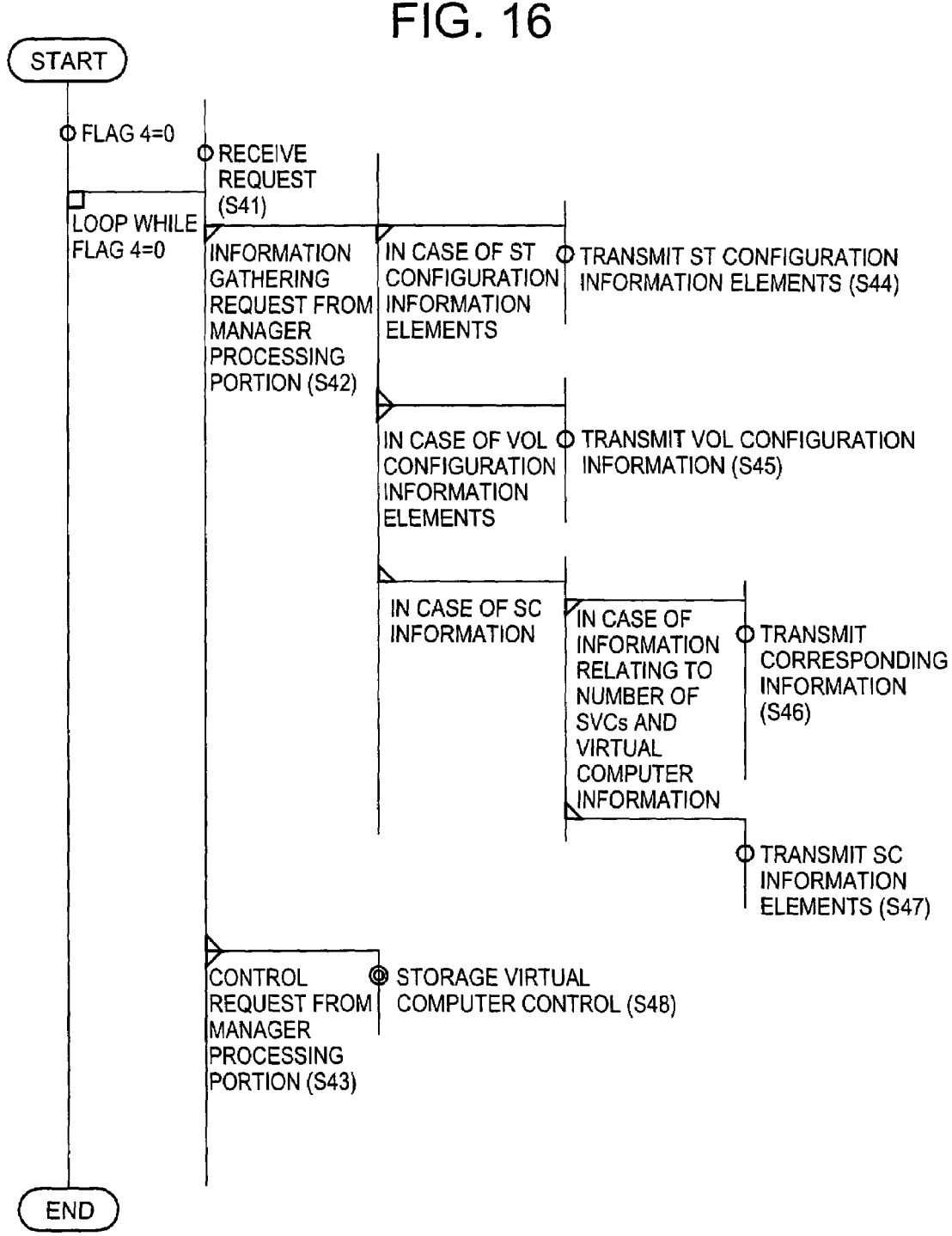
Figure 17:
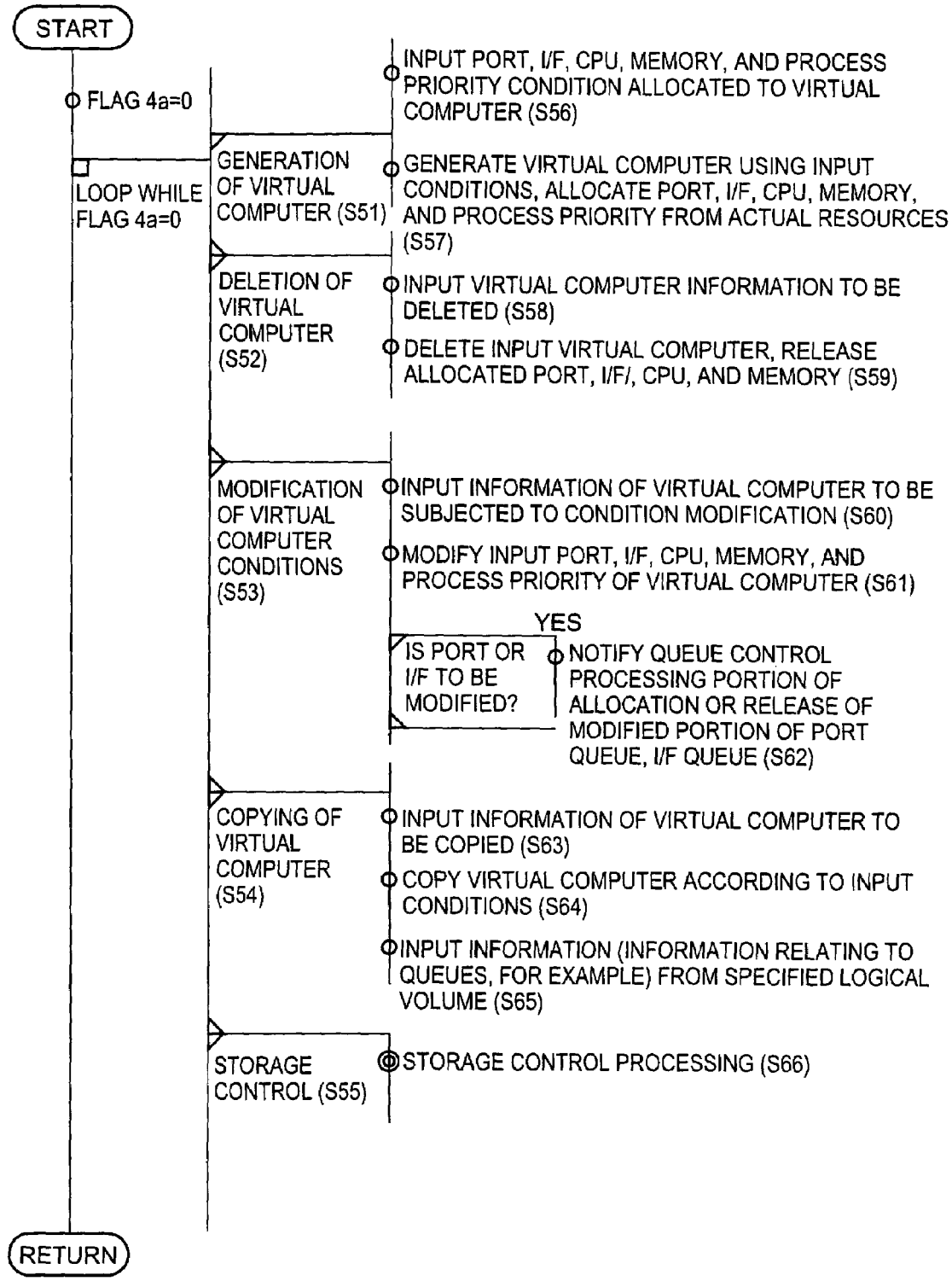
Figure 18:
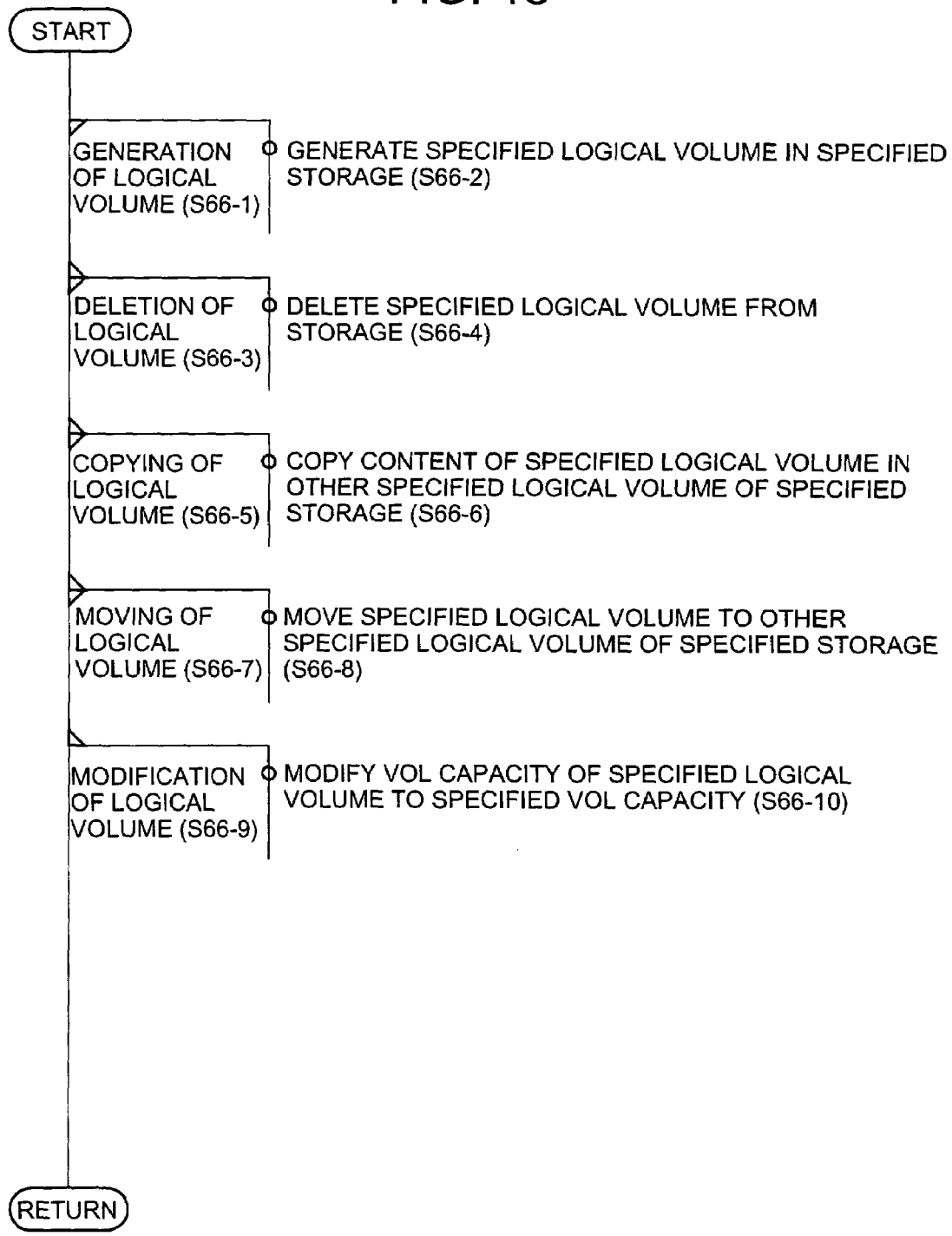
Figure 19:
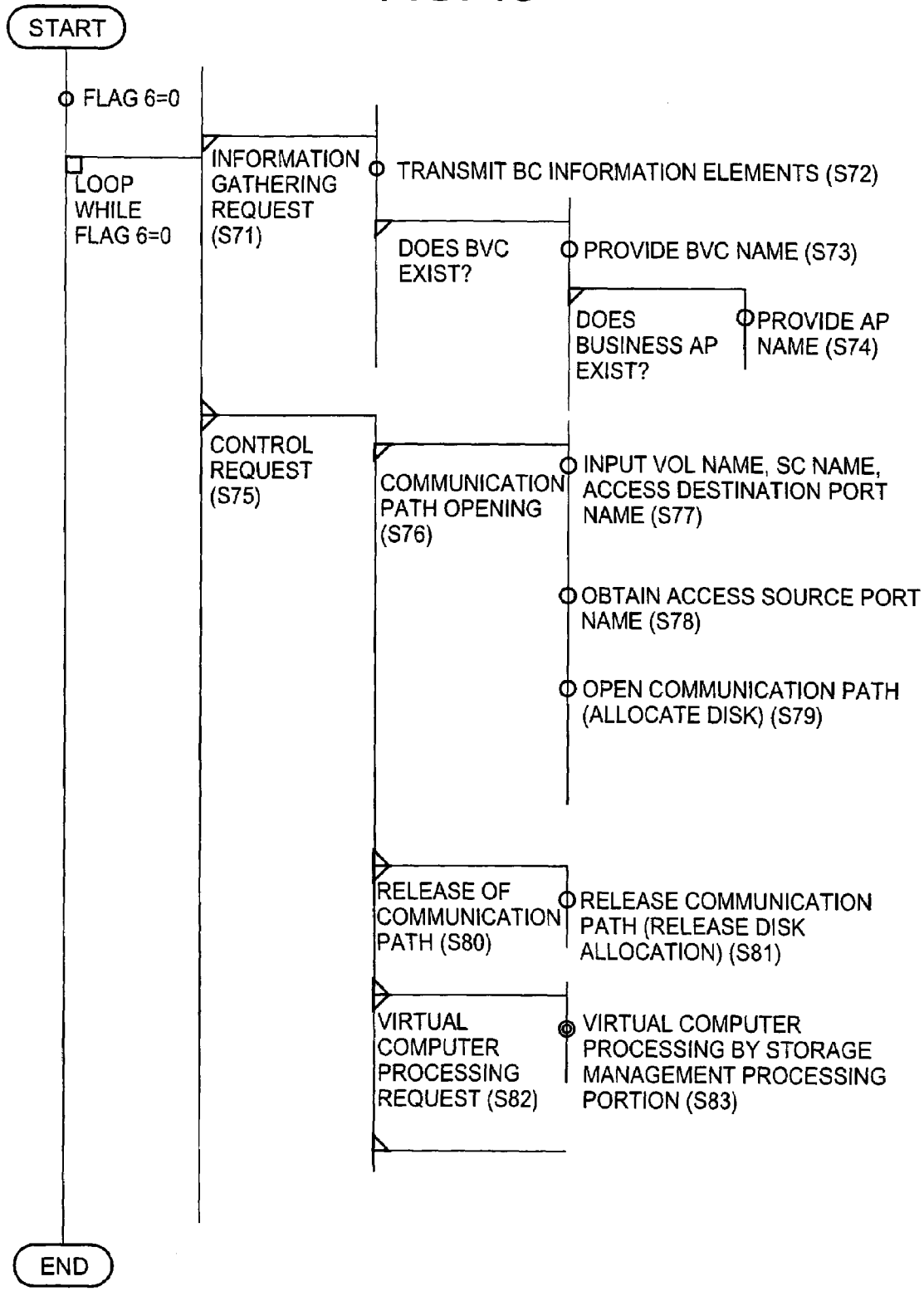
Figure 20:
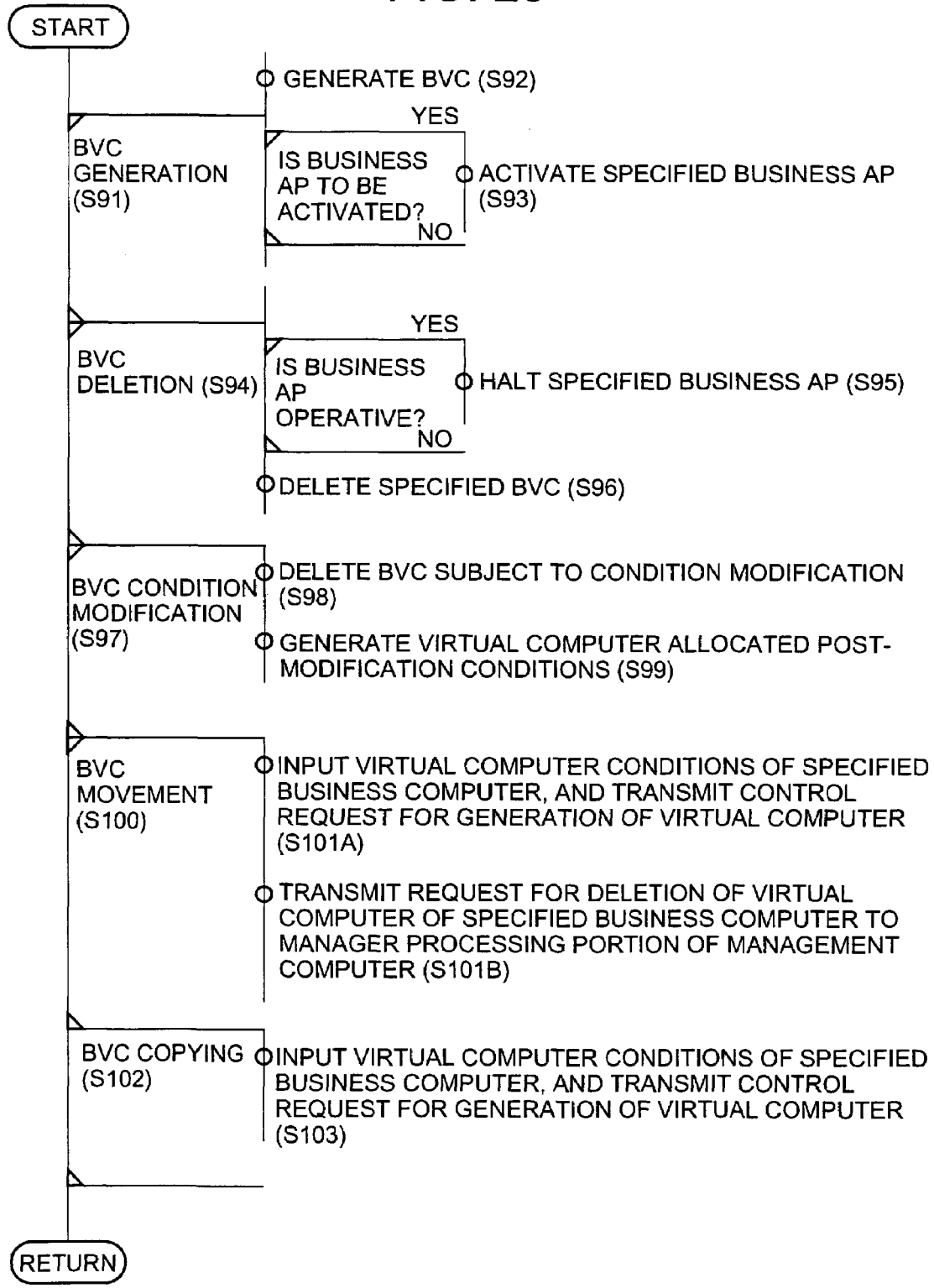

15B shows an example of virtual computer detailed information gathering processing performed in S33-5 of FIG. 15A;

FIG. 16 shows an example of processing performed by a storage agent processing portion 282;

FIG. 17 shows an example of processing performed by a virtual computer processing portion 93;

FIG. 18 shows an example of storage control processing performed by the virtual computer processing portion 93;

FIG. 19 shows an example of processing performed by a storage management processing portion 25 of a business computer 17; and FIG. 20 shows an example of virtual computer control processing performed by the storage management processing portion 25.

DETAILED DESCRIPTION OF THE PREFERRED EMBODIMENTS

An embodiment of the present invention will be described below with reference to the drawings.

Figure 1:
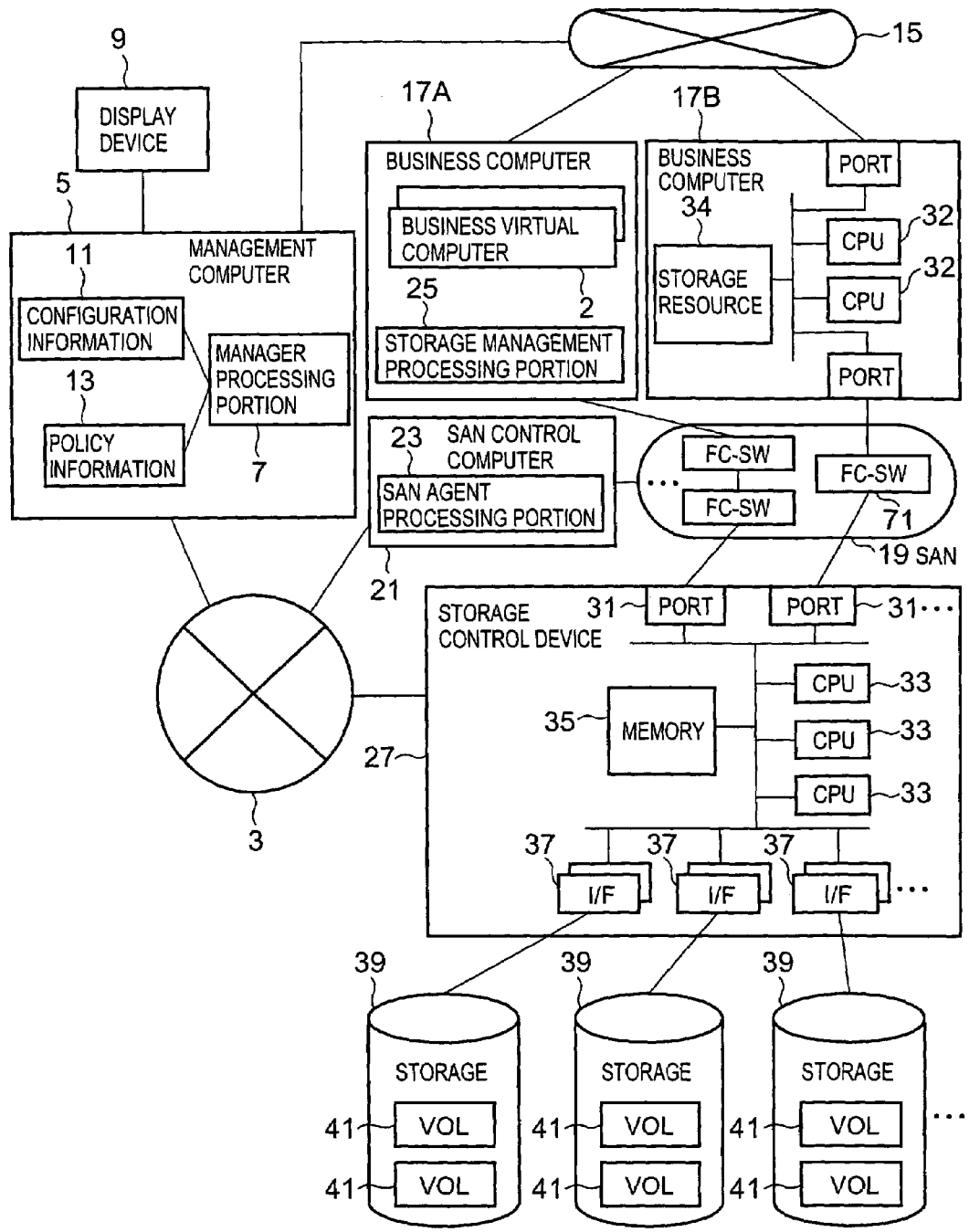
FIG. 1 shows in outline a constitutional example of a storage control system according to an embodiment of the present invention.

FIG. 1 shows in outline a constitutional example of a storage control system according to an embodiment of the present invention. Note that in the following description, when it is unnecessary to differentiate between like constitutional elements, only a parent numeral is used, but when it is necessary to differentiate between like constitutional elements, a branch numeral may be affixed to the parent numeral. Further, for ease of understanding, a branch numeral may not be used in the description even when the branch numeral is affixed in the drawings.

A plurality of (two in the illustrated example) business computers 17 and a management computer 5 are connected to a first communication network (for example, a LAN (Local Area Network) or the Internet) 15. The plurality of business computers 17 is also connected to a SAN (Storage Area Network) 19. A storage control device 27 and a SAN control computer 21 are connected to the SAN 19. The SAN control computer 21 is also connected to a second communication network 3. The aforementioned management computer 5 is connected to the second communication network (for example, a LAN or the Internet). The first communication network 15, second communication network 3, and SAN 19 do not necessarily have to be separate communication networks as described above, and at least two thereof may be constituted as a common network, for example.

At least one of the SAN control computer 21, the business computers 17, and the management computer 5 may be constituted by a personal computer, a workstation, a mainframe, or a server machine, for example. These computers 17, 21, and 5 may have substantially identical hardware configurations. In other words, taking the illustrated business computer 17B as a representative example, each computer 17, 21, and 5 may comprise one or more CPUs 32, a storage resource 34, and a port for connecting the computer to a communication network. The storage resource 34 may be constituted by one or a plurality of physical storage devices, for example, such as at least one memory and/or at least one disk type storage device (a hard disk, for example). The storage resource 34 of each computer 17, 21, and 5 is capable of storing one or more computer programs. The at least one CPU 32 is capable of reading the computer program from the storage resource 34 and executing the computer program.

The business computers 17 are used to execute predetermined business. Examples of this business include processing as a WEB server to provide a client machine, not shown in the drawing, with information, processing to provide the client machine, not shown in the drawing, with online services (for example, processing to receive a request to transfer funds from the bank account of the client to another bank account, and respond to the received request by executing the transfer), transaction processing, batch processing, and so on. For example, the business computers 17 may comprise a storage management processing portion 25 and one or a plurality of virtual computers (business virtual computers hereafter) 2. The business virtual computer 2 may be generated and deleted dynamically, and hence there may be cases where no business virtual computers 2 exist, and cases where many business virtual computers 2 exist in the business computers 17.

The management computer 5 is capable of managing the storage control system according to this embodiment. The storage resource of the management computer 5 is capable of storing configuration information 11, comprising information relating to various configurations, and policy information 13 relating to the conditions for executing predetermined processing. The management computer 5 may comprise a manager processing portion 7. By gathering various information from the business computer 17 and storage control device 27, the manager processing portion 7 is capable of constructing the configuration information 11 and displaying the obtained information on a display device (for example, a display screen of the client machine) 9 which is connected communicably to the management computer 5.

The SAN 19 may be constituted by a plurality of fiber channel switches (FC-SW hereafter) 71, for example. As a result of this constitution, the number of FC-SWs 71 existing on a communication path linking a first business computer 17A and the storage control device 27 may differ from the number of FC-SWs 71 existing on a communication path linking the second business computer 17B and the storage control device 27, for example. The number of FC-SWs 71 existing on a communication path may be expressed as the "communication path length".

The SAN control computer 21 manages the SAN 19, and may comprise a SAN agent processing portion 23. The SAN agent processing portion 23 will be described hereafter.

The storage control device 27 is capable of controlling one or more (three in the illustrated example) storages (hard disk drives, for example) 39 connected thereto. For example, the storage control device 27 may comprise one or more (two in the illustrated example) ports for connecting the storage control device 27 to the SAN 19, one or more CPUs 33, at least one memory 35, and one or more storage interface devices (abbreviated to I/F hereafter) 37 connected respectively to the one or more storages 39. The I/Fs 37 connected to the storages 39 may be multiplexed (doubled, for example).

A logical volume (occasionally abbreviated to VOL hereafter) 41 may be set in each of the plurality of storages 39. One logical volume 41 may be provided in each storage 39, as shown in the drawing, or provided over a plurality of the storages 39.

Figure 2:
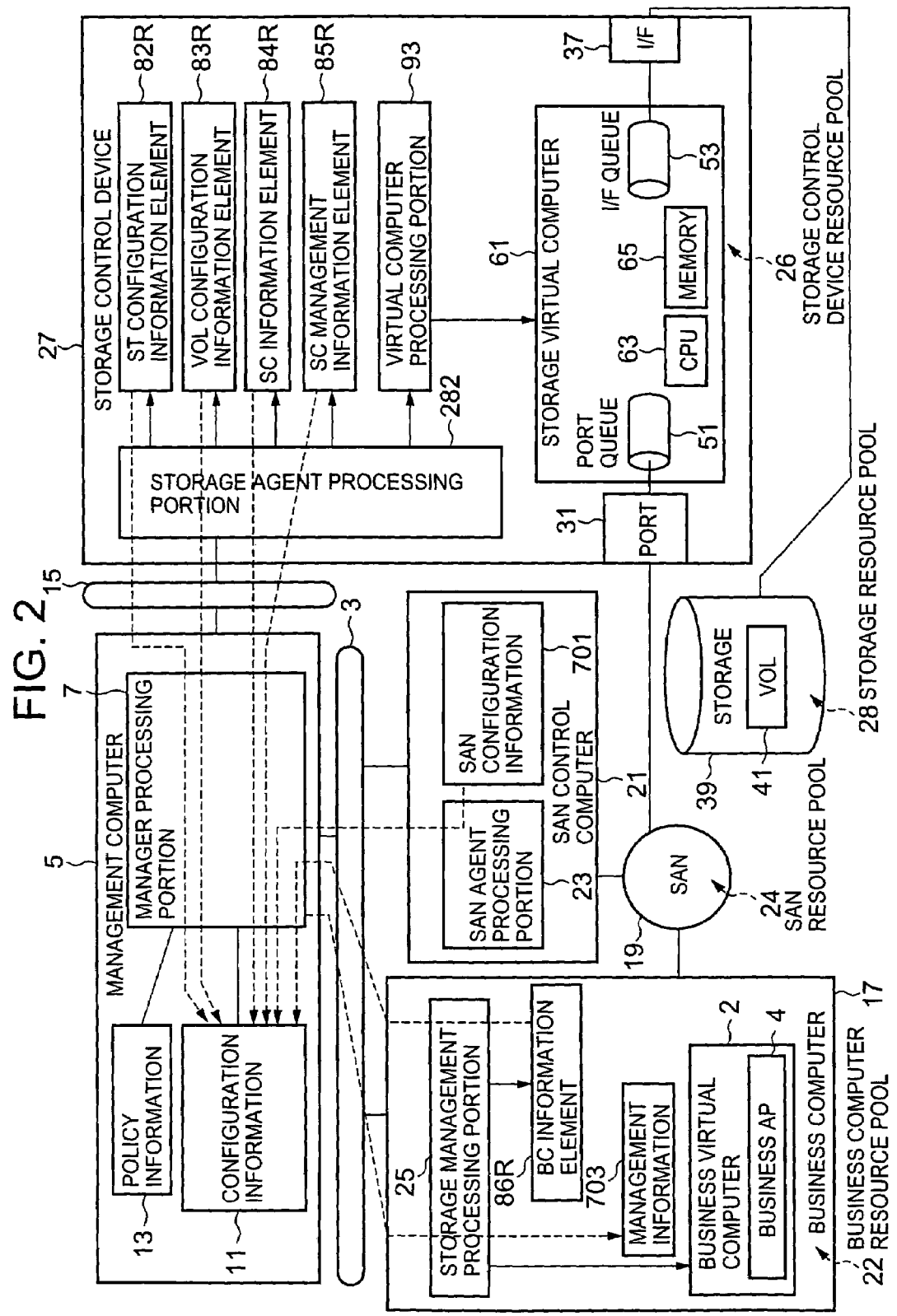
FIG. 2 is a block diagram illustrating the functions of the storage control system shown in FIG. 1.

FIG. 2 is a block diagram illustrating the functions of the storage control system shown in FIG. 1. Note that in the following description, to avoid lengthy descriptions and improve readability, the terms "storage", "storage control device", "storage virtual computer", "business computer", and "business virtual computer" are occasionally abbreviated to "ST", "SC", "SVC", "BC", and "BVC", respectively.

The manager processing portion 7 of the management computer 5 is capable of gathering various information from the business computers 17, storage control device 27, and SAN control computer 21, and constructing the configuration information 11 on the basis of the gathered information. More specifically, for example, the manager processing portion 7 is capable of constructing ST configuration information 82 (see FIG. 5B), VOL configuration information 83 (see FIG. 5C), SC information 84 (see FIGS. 6A to 7A), and SC management information 85 (see FIG. 7B) included in the configuration information 11 (see FIG. 5A), as described below, by gathering one or more ST configuration information elements 82R, one or more VOL configuration information elements 83R, one or more SC information elements 84R, and one or more SC management information elements 85R from each of the storage control devices 27. Further, for example, the manager processing portion 7 is capable of constructing BC information 86 (see FIG. 8A) included in the configuration information 11, as described below, by gathering one or more BC information elements 86R from each of the business computers 17. Further, referring to FIG. 5A, the manager processing portion 7 is also capable of generating combination information 81 on the basis of the constructed ST configuration information 82, VOL configuration information 83, SC information 84, SC management information 85, BC information 86, and SAN configuration information 701, and generating a mapping information group 87 using the generated combination information 81. These processes will be described in detail hereafter.

Returning to FIG. 2, the manager processing portion 7 is capable of transmitting to the business computer 17 management information (for example, information indicating the logical volumes 41 that can be accessed from each port of the business computer 17 via each port 31 of each storage control device 27) 703, which can be learned from the configuration information 11 and SAN configuration information 701. The manager processing portion 7 is also capable of controlling the storage control device 27 (for example, performing disaster recovery, copying, clustering, and storage modification) on the basis of the configuration information 11.

The SAN agent processing portion 23 is capable of managing information 701 relating to the configuration of the SAN 19 (SAN configuration information hereafter) in the storage resource of the SAN control computer 21. The SAN configuration information 701 may be constituted by information (see FIG. 4B) indicating the FC-SWs 71 that exist between each business computer 17 and each storage control device 27, the FC-SWs 71 that are connected to each FC-SW 71, and so on, for example.

The one or more CPUs, the storage resource, and so on provided in the business computer 17 may be considered as a business computer resource pool 22. The business computer 17 may be provided with the business virtual computer 2, which is allocated apart or all of the resource pool 22. Hence, although not illustrated in the drawing, the business virtual computer 2, similarly to a storage virtual computer 61 to be described below, may comprise a virtual CPU and a virtual storage resource. By means of this virtual CPU, the business virtual computer 2 is capable of executing an application program (business AP hereafter) for performing predetermined business.

The storage management processing portion 25 is capable of generating the business virtual computer 2, comprising all or a part of the business computer resource pool 22 (for example, a usage proportion of at least one of the CPUs 32 and a storage area of the storage resource 34), in the business computer 17. Conversely, the storage management processing portion 25 is also capable of deleting the business virtual computer 2 by releasing the part of the resource pool provided in the business virtual computer 2. Then, based on the generation, deletion, and so on of the business virtual computer 2, the storage management processing portion 25 is capable of updating at least one of the one or more BC information elements 86R stored in the storage resource of the business computer 17. Further, when a predetermined event occurs (for example, a request is received from the manager processing portion 7 or the BC information elements 86R are updated), the storage management processing portion 25 is capable of transmitting all or a part (only the updated information element, for example) of the one or more BC information elements 86R to the manager processing portion 7. The storage management processing portion 25 is also capable of receiving the management information 703 from the manager processing portion 7 and writing the received management information 703 into the storage resource of the business computer 17.

The storage area of the storages 39 may be considered as a resource pool 28 of the storages 39. The logical volumes 41 may be provided in all or a part of this resource pool 28.

Figure 3:
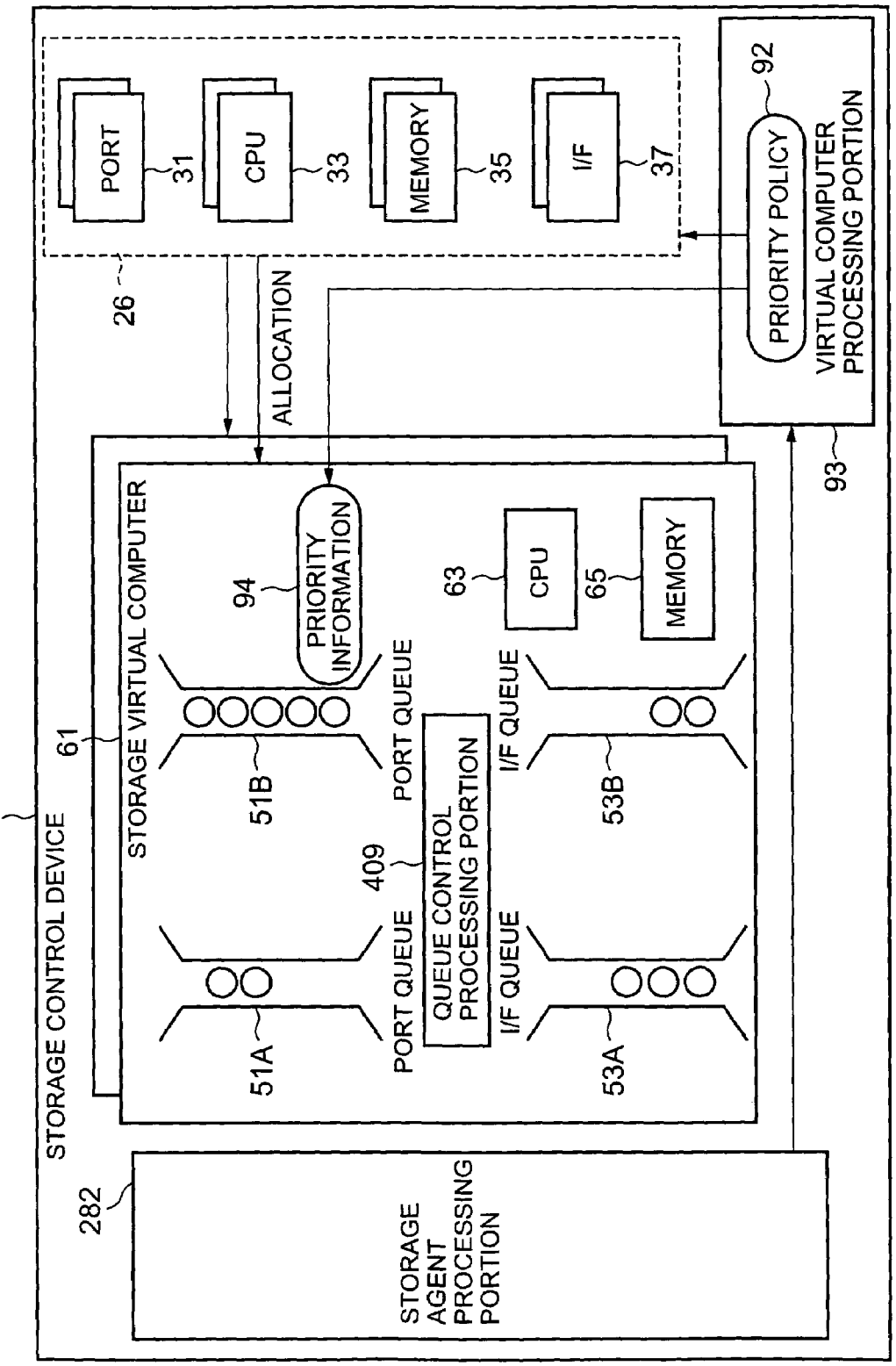
FIG. 3 illustrates a storage control device 27 shown in FIG. 2 in further detail; the storage control device 27 will be described with reference to FIGS. 2 and 3.

FIG. 3 illustrates the storage control device 27 shown in FIG. 2 in further detail. The storage control device 27 will now be described with reference to FIGS. 2 and 3.

The hardware group (for example, the one or more CPUs 33, at least one memory 35, one or more ports 31, and one or more I/Fs 37) provided in the storage control device 27 may be considered as a storage control device resource pool 26. Various information, such as the one or more ST configuration information elements 82R, one or more VOL configuration information elements 83R, one or more SC information elements 84R, and one or more SC management information elements 85R, for example, is stored in the storage resources of the resource pool 26.

The storage control device 27 comprises a storage agent processing portion 282, a virtual computer processing portion 93, and a queue control processing portion 409. The storage agent processing portion 282 and virtual computer processing portion 93 may be constituted by hardware, computer programs, or a combination thereof, but in this embodiment, it is assumed that the storage agent processing portion 282 and virtual computer processing portion 93 are constituted by computer programs (likewise regarding the manager processing portion 7, SAN agent processing portion 23, storage management processing portion 25, virtual computer processing portion 93, and queue control processing portion 409). Hence, the storage agent processing portion 282 and virtual computer processing portion 93 can be operated by being read from the at least one memory 35 into the CPU 33, for example.

The storage agent processing portion 282 is capable of monitoring the state of the resource pool 26 of the storage control device 27 (for example, the usage proportion of the CPUs 33, the usable capacity of the memory 35, the number of existing storage virtual computers 61, which part of the resource pool 26 is allocated to which virtual computer, and so on), for example. Further, for example, the storage agent processing portion 282 is capable of updating at least one of the one or more ST configuration information elements 82R, one or more VOL configuration information elements 83R, one or more SC information elements 84R, and one or more SC management information elements 85R on the basis of the monitoring result. Further, for example, when a predetermined event occurs (for example, a request is received from the manager processing portion 7 or at least one of the information elements 82R, 83R, 84R, 85R is updated), the storage agent processing portion 282 is capable of transmitting at least one of the information elements 82R, 83R, 84R, 85R (only the updated information element, for example) to the manager processing portion 7. Further, for example, the storage agent processing portion 282 is capable of causing the virtual computer processing portion 93 to generate or delete the storage virtual computer 61 on the basis of the aforementioned monitoring result.

The virtual computer processing portion 93 is capable of generating or deleting the virtual computer (storage virtual computer hereafter) 61, allocated all or a part of the storage control device resource pool 26, under the control of the storage agent processing portion 282. Further, the virtual computer processing portion 93 is capable of obtaining from the memory 35, for example, a priority policy 92 describing conditions relating to various priorities (for example, the order of precedence of each virtual computer and the order of processing precedence), and is also capable of specifying priority information (for example, information indicating which processing should be performed over which processing) 94 to be set in the generated storage virtual computer 61 by referring to the priority policy 92, and setting the specified priority information 94 in the storage virtual computer 61. The storage virtual computer 61 shown as an example in FIG. 3 comprises an allocated CPU resource (for example, all or a part (a usage proportion, for example) of one or a plurality of the CPUs 33) as a virtual CPU 63, and also comprises an allocated memory resource (for example, all or a part of one or a plurality of the memories 35) as a virtual memory 65, a virtual port queue 51, and a virtual I/F queue 53. The port queue 51 is capable of storing information elements (requests or data packets, for example) to be input or output into/from the port 31. The I/F queue 53 is capable of storing information elements to be input or output into/from the I/F 37.

The queue control processing portion 409 may be activated when the number of storage virtual computers 61 existing in the storage control device 27 switches from zero to one, for example, and halted when the number returns to zero. Further, for example, the queue control processing portion 409 is capable of generating or deleting the port queue 51 or I/F queue 53 in at least one of the one or more storage virtual computers 61 in accordance with an instruction from the storage agent processing portion 282 (at this time, the queues 51 may be allocated to the ports 31 (or the queues 53 may be allocated to the I/Fs 37) in a ratio of 1:1, N:1 (where N is an integer of 2 or more), or 1:N). Further, for example, the queue control processing portion 409 is capable of monitoring the state of the queues 51, 53 (for example, the respective numbers of queues 51, 53, the number of information elements accumulated in the queues 51, 53, and so on) in each storage virtual computer 61, and notifying the storage agent processing portion 282 of the monitoring result.

The various elements of the storage control system according to this embodiment will now be described in detail.

Figure 4A:
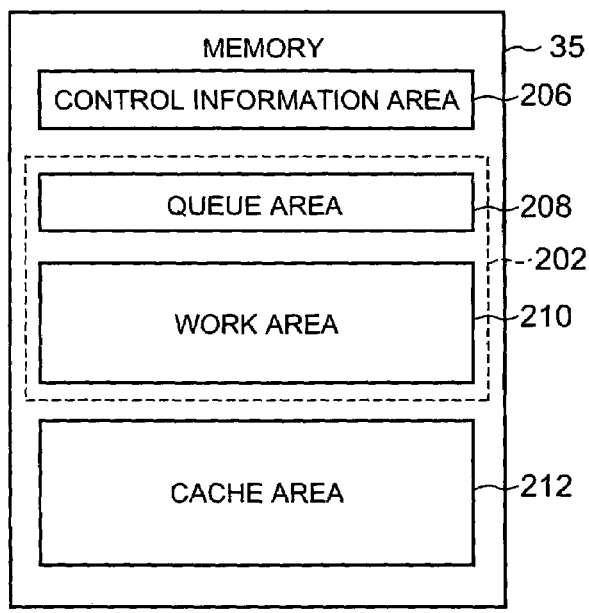
FIG. 4A shows an example of usage of a storage area of at least one memory 35 in the storage control device 27.

FIG. 4A shows an example of usage of the storage area of the at least one memory 35 in the storage control device 27.

A control information area 206, a storage virtual computer area 202, and a cache area 212, for example, are provided in the storage area of the at least one memory 35.

Information relating the constitution of the storage control device 27, information relating to the plurality of storages 39 connected to the storage control device 27, and so on are stored in the control information area 206.

The storage virtual computer area 202 is provided for each storage virtual computer 61. Hence, for example, when M (where M is an integer of 0 or more) storage virtual computers 61 exist, M storage virtual computer areas 202 also exist. A queue area 208 and a work area 210 are provided in each storage virtual computer area 202. The queue area 208 is used as the port queue 51 and I/F queue 53. The work area 210 is used as the virtual memory 65.

The cache area 212 is for storing data exchanged between the business computer 17 and storage 39 temporarily. More specifically, when the storage virtual computer 61 receives data to be written and a write request from the business computer 17, for example, the data to be written may be stored temporarily in the cache area 212, read from the cache area 212, and then written into the logical volume 41. Further, when the storage virtual computer 61 receives a read request from the business computer 17, for example, the data to be read may be read from the logical volume 41, stored temporarily in the cache area 212, read from the cache area 212, and then transmitted to the business computer 17.

Figure 4B:
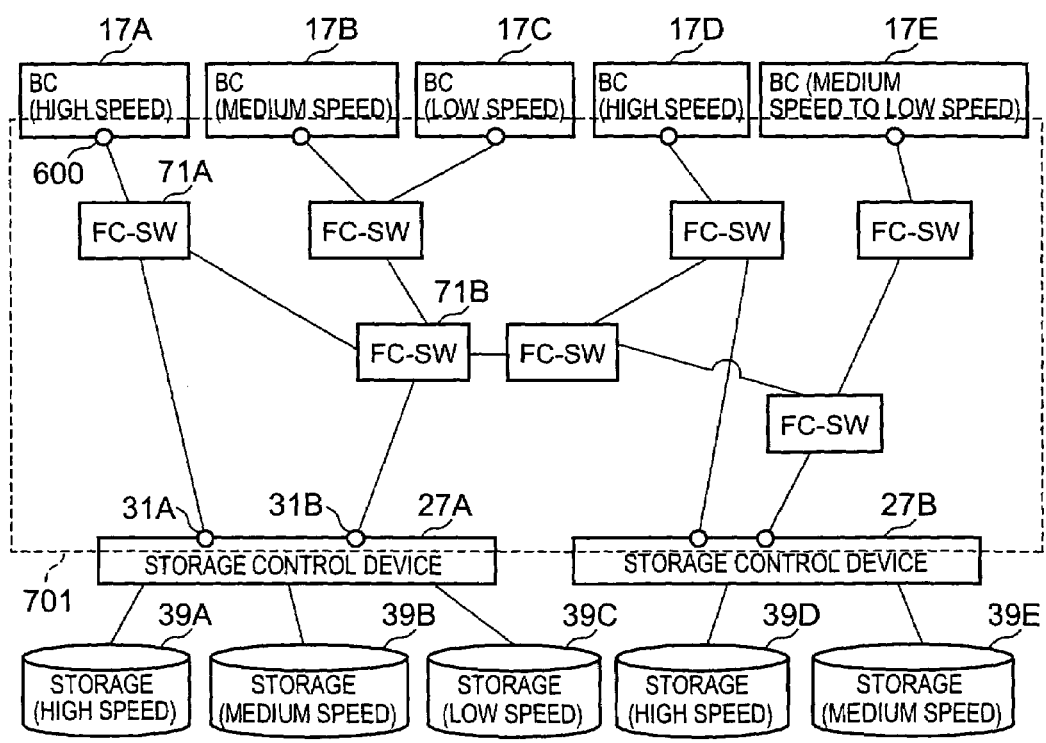
FIG. 4B shows a schematic example of SAN configuration information 701 that is managed by a SAN agent processing portion 23.

FIG. 4B shows a schematic example of the SAN configuration information 701 managed by the SAN agent processing portion 23.

As described above, the SAN configuration information 701 may be constituted by information indicating the FC-SWs 71 that exist between each port of each business computer 17 and each port 31 of each storage control device 27, which FC-SWs 71 are connected to which FC-SWs 71, and so on. More specifically, for example, the SAN configuration information may comprise an ID for the port of the business computer 17, an ID for the port of the storage control device 27, and one or more IDs corresponding respectively to the one or more FC-SWs existing between these ports, for each of the communication paths between each business computer 17 and each storage control device 27. The one or more IDs corresponding respectively to the one or more FC-SWs may be arranged in order of connection from the business computer 17 to the storage control device 27.

The SAN agent processing portion 23 is capable of specifying the configuration shown in the example in FIG. 4B by referring to the SAN configuration information 701. More specifically, for example, the SAN agent processing portion 23 learns that a port 600 of the business computer 17A is connected to a first port 31A of the storage control device 27A via an FC-SW 71A, or in other words that one FC-SW 71 exists on a first communication path linking the port 600 of the business computer 17A and the first port 31A. Further, for example, the SAN agent processing portion 23 learns that the port 600 of the business computer 17A is connected to a second port 31B of the storage control device 27A via the FC-SW 71A and an FC-SW 71B, or in other words that two FC-SWs 71 exist on a second communication path linking the port 600 of the business computer 17A and the second port 31B. From this, it is learned that the second communication path is logically longer than the first communication path. In this example, the logical distance of the communication path is determined according to the number of repeaters (not limited to FC-SWs) passed through when communication between computers, including the storage control device 27, is performed on a network. When regarding the communication path distance in terms of network band allocation, for example, network band allocation is more likely to be performed smoothly when the logical distance of the communication path is short. In other words, as the number of repeaters increases, network band allocation becomes more complicated and it becomes less likely that the allocated network band can be used effectively.

Next, the configuration information 11 constructed by the manager processing portion 7 of the management computer 5 will be described. Before that, however, a more specific constitutional example of the storage control system according to this embodiment will be described using FIG. 4B.

In this embodiment, it is assumed that at least business computers 17A to 17E exist, for example. It is also assumed that of these business computers 17A to 17E, the business computers 17A and 17D have a high processing speed (for example, comprise a CPU with a large operating frequency), the business computer 17B has a medium processing speed, and the business computer 17C has a low processing speed. The business computer 17E, for example, is assumed to be loaded with a plurality of blade type computers (so-called blade servers, for example), and has either a medium or a low processing speed. Note that here, the processing speed is used as the performance element of the business computer 17, but other performance elements may be used instead of, or in addition to, the processing speed. Furthermore, the processing speed is not limited to three levels, namely high, medium, and low, and may be separated into more or less levels.

It is also assumed that at least storage control devices 27A and 27B exist. Storages 39A to 39C are connected to the storage control device 27A, and storages 39D and 39E are connected to the storage control device 27B. The storages 39A and 39D have a high writing speed, the storages 39B and 39E have a medium writing speed, and the storage 39C has a low writing speed. Note that here, the writing speed is used as a performance element of the storages 39, but other performance elements (reliability, for example (as a specific example thereof, the MBTF (Mean Time Between Failure) may be cited)) may be used instead of, or in addition to, the writing speed. Furthermore, the writing speed is not limited to three levels, namely high, medium, and low, and may be separated into more or less levels.

Within this constitution, the configuration information 11 is constructed as described below, for example.

FIG. 5A shows a constitutional example of configuration information constructed in the storage control system shown as an example in FIG. 4B.

As shown in the drawing, the configuration information 11 comprises the combination information 81, ST configuration information 82, VOL configuration information 83, SC information 84, SC management information 85, BC information 86, and the mapping information group 87. Of this information, the manager processing portion 7 is capable of constructing the ST configuration information 82, VOL configuration information 83, SC information 84, SC management information 85, and BC information 86 from the one or more ST configuration information elements 82R, one or more VOL configuration information elements 83R, one or more SC information elements 84R, one or more SC management information elements 85R, and one or more BC information elements 86R gathered thereby. The manager processing portion 7 is also capable of generating the combination information 81 on the basis of the ST configuration information 82, VOL configuration information 83, SC information 84, SC management information 85, BC information 86, and SAN configuration information 701, and is also capable of generating the mapping information group 87 using the generated combination information 81.

Each type of information will now be described.

FIG. 5B shows a constitutional example of the ST configuration information 82.

The ST configuration information 82 is constituted by the plurality of ST configuration information elements (records, for example) 82R, and relates to each of the plurality of storages 39 provided in the storage control system according to this embodiment, for example. Each ST configuration information element 82R comprises, for example, a "storage name", which is the name of the storage 39 corresponding to the element 82R, a "storage capacity", which is the storage capacity of the storage 39, a "used storage capacity", which is the storage capacity of the storage 39 that is used as the VOL 41, and a "performance", indicating the writing speed of the storage 39. Note that each ST configuration information element 82R may also comprise information (the name of the storage control device 27, for example) expressing the storage control device 27 to which the storage 39 is connected, for example. Further, the storage 39 may be specified by a multiple ID rather than a name (likewise in the case of the other elements to be described below). The information indicating high speed, medium speed, and low speed in the "performance" section may be set manually, for example, or may be set automatically on the basis of a predetermined rule (for example, a rule whereby a certain writing speed range corresponds to a certain speed) (likewise in the case of the "performance" level of the business computer 17).

By referring to the ST configuration information 82, it is possible to determine the number of storages 39 in the storage control system according to this embodiment, the performance level of each storage 39, the storage capacity thereof, and the storage capacity that is allocated as the VOL 41, for example.

FIG. 5C shows a constitutional example of the VOL configuration information 83.

The VOL configuration information 83 is constituted by the plurality of VOL configuration information elements (records, for example) 83R, and relates to each of the plurality of VOLs 41 provided in the storage control system according to this embodiment, for example. Each VOL configuration information element 83R comprises, for example, a "storage name" of the storage 39 comprising the VOL 41 corresponding to the element 83R, a "VOL name", which is the name of the VOL 41, a "VOL capacity", which is the storage capacity of the VOL 41, and a "used VOL capacity", which is the storage capacity of the VOL 41 that is in use (for example, the capacity occupied by information).

By referring to the VOL configuration information 83, it is possible to determine the VOLs 41 that exist in each storage 39 in the storage control system according to this embodiment. Further, by referring to the storage configuration information 82 shown in the example in FIG. 5B, the performance and so on of the storage 39 can be learned.

FIG. 6A shows a constitutional example of the SC information 84.

The SC information 84 is constituted by the plurality of SC information elements (records, for example) 84R, and relates to each of the storage control devices 27 provided in the storage control system according to this embodiment, for example. Each SC information element 84R comprises, for example, an "SC name", which is the name of the storage control device 27 corresponding to the element 84R, a "number of connected storages", which is the number of storages 39 connected to the storage control device 27, "storage control information", which is control information relating to the storage control device 27, and "connected storage information", which is information relating to the connected storages 39. The connected storage information includes the "ST name" of each connected storage, for example.

FIG. 6B shows a constitutional example of the storage control information included in the SC information element 84R.

The storage control information comprises, for example, a "number of loaded ports", which is the number of ports 31 loaded in the storage control device 27 corresponding to the element 84R, "loaded port information", which is information relating to each port 31, and a "number of loaded I/Fs", which is the number of I/Fs 37 loaded in the storage control device 27. The storage control informational so comprises, for example, "loaded I/F information", which is information relating to the I/F 37, a "number of SVCs", which is the number of storage virtual computers 61 existing in the storage control device 27, and "SVC information", which is information relating to the storage virtual computer 61. Further, the storage control information comprises, for example, a "number of loaded CPUs", which is the number of CPUs 33 loaded in the storage control device 27, and a "loaded memory capacity", which is the storage capacity provided by the at least one or more memories 35 loaded into the storage control device 27. The symbols n, m, p, and e in the drawing denote values, and the symbol f is a numerical value in megabyte units, for example.

For each storage virtual computer 61, the SVC information comprises, for example, an "SVC name", which is the name of the storage virtual computer 61, and a "presence of detailed information", which indicates whether or not detailed information is provided for the storage virtual computer 61.

FIG. 7A shows a constitutional example of the detailed information for the storage virtual computer 61.

The detailed information relating to the storage virtual computer 61 comprises, for example, a "number of used ports", which is the number of ports 31 allocated to the storage virtual computer 61, "used port information", which is information relating to each port 31, a "number of used I/Fs", which is the number of I/Fs 37 allocated to the storage virtual computer 61, and "used I/F information", which is information relating to each I/F 37. The detailed information also comprises, for example, a "number of used CPUs", which is the number of CPUs 33 allocated to the storage virtual computer 61, "used CPU information", which is information relating to each CPU 33, and a "used memory capacity", which is the capacity of the memory 35 allocated to the storage virtual computer 61 (the symbol y in the drawing is a numerical value in megabyte units, for example) Further, the detailed information comprises, for example, a "number of port queues", which is the number of port queues 51 existing in the storage virtual computer 61, "port queue information", which is information relating to each port queue 51, a "number of I/F queues", which is the number of I/F queues 53 existing in the storage virtual computer 61, and "I/F queue information", which is information relating to each I/F queue 53.

The used port information comprises, for example, a "port name" of each port 31, and the number of port names is the same as the "number of used ports". The used I/F information comprises, for example, an "I/F name" of each I/F 37, and the number of I/F names is the same as the "number of used I/Fs". The used CPU information comprises, for example, a set comprising a "CPU name" and a "CPU usage proportion" for each CPU 33, and the number of sets is the same as the "number of CPUs". Here, the "CPU usage proportion" may indicate the allocated usage ratio or the actual proportion of the CPU currently in use. In terms of the example in FIG. 7A, of the three CPUs 33A to 33C, 100% of the CPU 33A, 50% of the CPU 33B, and 80% of the CPU 33C are allocated, and this may indicate that the virtual CPU 63 has been allocated to the storage virtual computer 61 and the virtual CPU 63 may be used within the allocated range, or that all of the three CPUs 33A to 33C are allocated, and at a certain usage point, 100% of the CPU 33A, 50% of the CPU 33B, and 80% of the CPU 33C are in use.

By referring to this SC information 84, it is possible to determine which storage control devices 27 exist in the storage control system according to this embodiment, which storage virtual computers 61 exist in each storage control device 27, and so on, for example. By referring to the information 82, 83 shown in the examples in FIGS. 5B and 5C, it is also possible to determine the storages 39 that are connected to each storage control device 27.

FIG. 7B shows a constitutional example of the SC management information 85.

The SC management information 85 is constituted by the plurality of SC management information elements (records, for example) 85R, and expresses the structure of the logical paths between each port 31 of the storage control devices 27 and each VOL 41. Each SC management information element 85R comprises, for example, a "VOL name" of the VOL 41 at one end of a path, an "SVC name" of the storage virtual computer 61 capable of accessing the VOL 41, a "port name" of the port 31 allocated to the storage virtual computer 61, and an "I/F name" of the I/F 37.

By referring to the SC management information 85, it is possible to learn, for example, that information input through the port 31A is received by a storage virtual computer 61A, and that the storage virtual computer 61A writes this information into a VOL 41A via the I/F 37A.

The storage virtual computer 61 is capable of controlling data exchange between the business virtual computer 2 and VOL 41 in accordance with the SC management information elements 85R. For example, the storage virtual computer 61 is capable of receiving a write request and write subject data from the business virtual computer 2 via the port 31 having the port name which corresponds to the SVC name of the storage virtual computer 61 itself, writing the write subject data into the cache area 212 of the memory 35 temporarily, and writing the write subject data written into the cache area 212 into the VOL 41 having the VOL name that corresponds to the SVC name of the storage virtual computer 61 itself via the I/F 37 having the I/F name that corresponds to the SVC name of the storage virtual computer 61 itself. The storage virtual computer 61 is also capable of receiving a read request from the business virtual computer 2 via the port 31 having the port name which corresponds to the SVC name of the storage virtual computer 61 itself, reading the read subject data corresponding to the read request from the VOL 41 having the VOL name that corresponds to the SVC name of the storage virtual computer 61 itself via the I/F 37 having the I/F name that corresponds to the SVC name of the storage virtual computer 61 itself, writing the read subject data read from the VOL 41 into the cache area 212 of the memory 35 temporarily, and then transmitting the read subject data written into the cache area 212 to the business virtual computer 2 which transmitted the read request via the port 31 having the port name which corresponds to the SVC name of the storage virtual computer 61 itself.

The SC management information elements 85R may be added to, deleted, or updated every time the storage virtual computer 61 is generated, deleted, copied, subjected to condition modification, and so on in accordance with a request from the manager processing portion 7 received via the storage agent processing portion 282, for example.

Figures 8A, 8B:
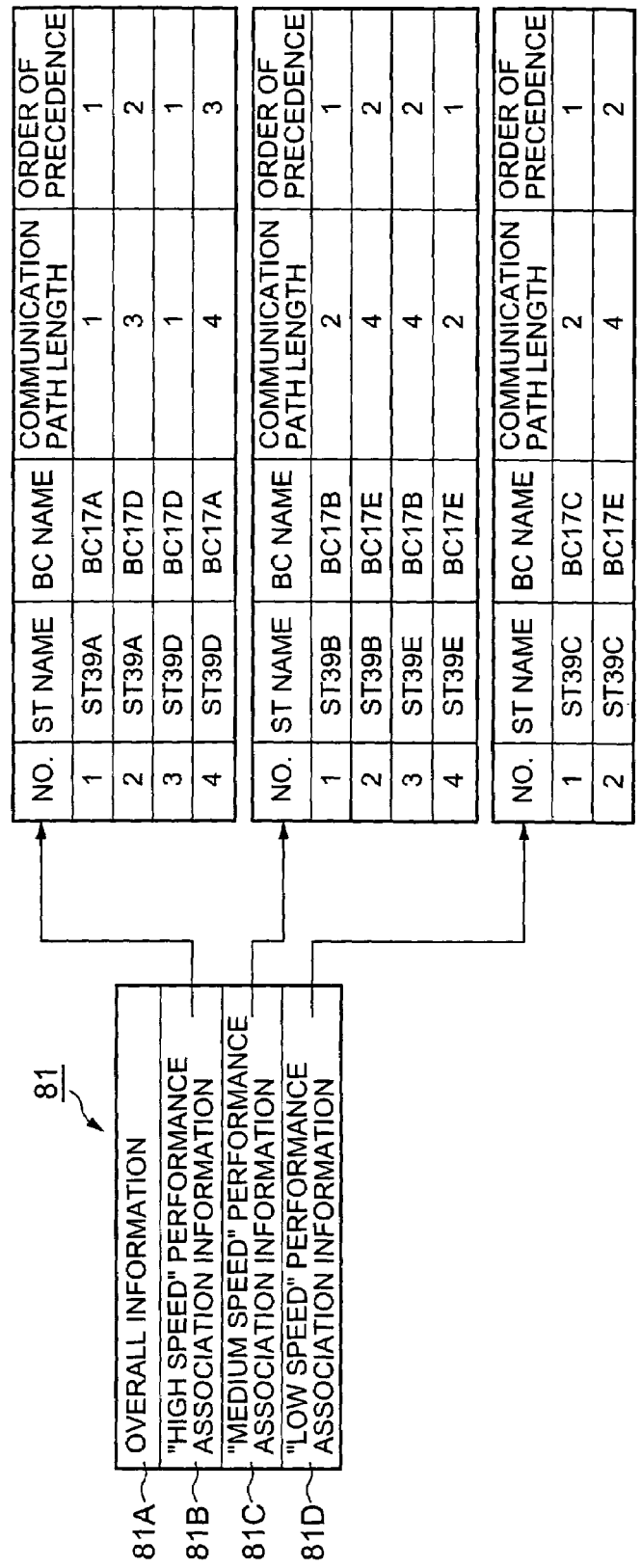
FIG. 8A shows a constitutional example of BC information 86.
FIG. 8B shows a constitutional example of combination information 81.

FIG. 8A shows a constitutional example of the BC information 86.

The BC information 86 is constituted by the plurality of BC information elements (records, for example) 86R, and relates to the plurality of business computers 17 provided in the storage control system according to this embodiment. Each BC information element 86R comprises, for example, a "BC name", which is the name of the business computer 17 corresponding to the element 86R, a "performance", relating to the processing speed of the business computer 17, and a "port name" of the port 600 provided in the business computer 17.

By referring to the BC information 86, it is possible to determine the number of business virtual computers 2 existing in each business computer 17 and the type of business AP 4 that can be executed by each business virtual computer 2, for example.

Figure 9A:
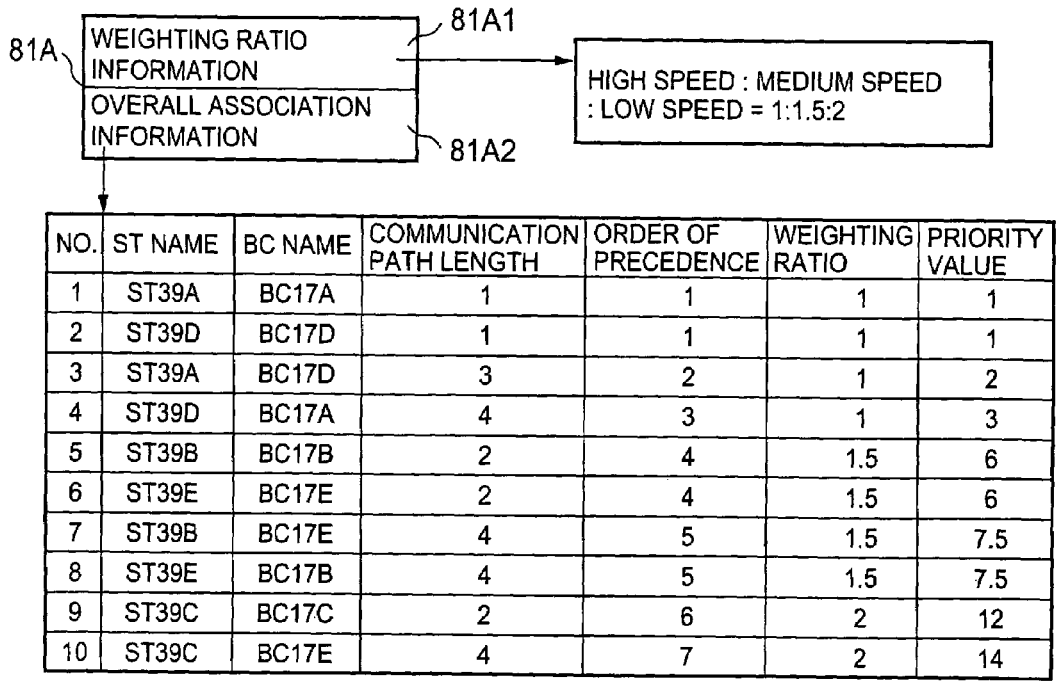
FIG. 9A shows a constitutional example of overall information 81A in the combination information 81.
Figure 9B:
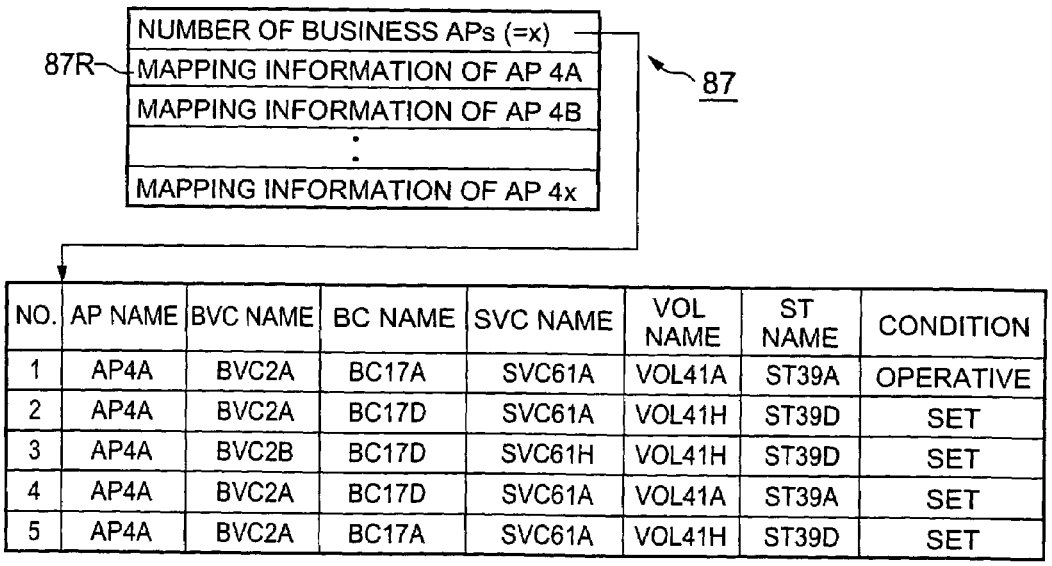
FIG. 9B shows a constitutional example of a mapping information group 87 included in configuration information 11.

Note that when the mapping information group 87, to be described with reference to FIG. 9B, is constructed, for example, information relating to the business virtual computer 2 existing in the business computer 17 corresponding to the element 86R (for example, the "BVC name", which is the name of the business virtual computer 2, and an "AP name", which is the name of the business AP 4 executed by the business virtual computer 2) is associated with the BC information element 86R on the basis of the mapping information group 87. This will be described hereafter.

FIG. 8B shows a constitutional example of the combination information 81.

The combination information 81 comprises, for example, overall information 81A, "high speed" performance association information 81B, "medium speed" performance association information 81C, and "low speed" performance association information 81D.

The "high speed" performance association information 81B is information relating to the association between the business computers 17 and storages 39 having "high speed" performance. The "medium speed" performance association information 81C is information relating to the association between the business computers 17 and storages 39 having "medium speed" performance. The "low speed" performance association information 81D is information relating to the association between the business computers 17 and storages 39 having "low speed" performance (hereafter, the association between the business computer 17 and storage 39, or the association between an ST name and a BC name, will occasionally be referred to as an "ST-BC set"). The association information 81B, 81C, and 81D each comprise sets of the "ST name" of the storages 39 and the "BC name" of the business computers 17 having the "performance" corresponding to the information, a "communication path length" expressing the logical distance between the storage 39 (more precisely, the storage control device 27 connected to the storage 39) and the business computer 17, and an "order of precedence" of the set of the storage 39 and business computer 17. The "communication path length" may be expressed as the number of FC-SWs 71 existing between the storage 39 and business computer 17 such that the communication path length increases as the number increases. The "order of precedence" may be determined on the basis of a predetermined rule. More specifically, for example, the "order of precedence" may be set such that priority becomes steadily higher (the numerical value thereof becomes smaller) as the communication path length decreases.

FIG. 9A shows a constitutional example of the overall information 81A in the combination information 81.

The overall information 81A comprises weighting ratio information 81A1 and overall association information 81A2, for example.

The weighting ratio information 81A1 expresses the weighting ratio of each performance level. The weighting ratio is the ratio when the performance level "high speed" is set as one, for example. As a specific example, high speed: medium speed:low speed=1:1.5:2. Here, the weighting is reduced as the weighting ratio increases. The weighting ratio information 81A1 may be updated by the manager processing portion 7 in accordance with an instruction from the display device 9, for example (see FIG. 1, a client machine, for example).

The overall association information 81A2 relates to all of the ST-BC sets existing in the storage control system according to this embodiment, and expresses the "ST name", "BC name", "communication path length", "order of precedence", "weighting ratio", and a "priority value" (the "priority value" will be described below), for example.

The manager processing portion 7 is capable of generating the combination information 81 described above on the basis of the ST configuration information 82, VOL configuration information 83, SC information 84, SC management information 85, BC information 86, and SAN configuration information 701.

More specifically, the manager processing portion 7 gathers one or more ST configuration information elements 82R, one or more VOL configuration information elements 83R, one or more SC information elements 84R, one or more SC management information elements 85R, and one or more BC information elements 86R, and constructs the ST configuration information 82, VOL configuration information 83, SC information 84, SC management information 85, and BC information 86 from these gathered information elements.

By referring to the ST configuration information 82 (see FIG. 5B), the manager processing portion 7 can specify the performance level of each storage 39. By referring to the BC information 86 (see FIG. 8A), the manager processing portion 7 can specify the performance level and port name (BC port name hereafter) of the each business computer 17.

On the basis of the specified performance level, the manager processing portion 7 can create the association information 81B to 81D for each performance level. This will now be described taking creation of the "high speed" performance association information 81B as a representative example. The manager processing portion 7 is capable of associating the ST names and BC names having the performance level "high speed" (in other words, creating ST-BC sets). By referring to the VOL configuration information 83 (see FIG. 5C) and the SC management information 85 (see FIG. 7B), the manager processing portion 7 can specify the VOL name corresponding to the ST name and the port name (ST port name hereafter) corresponding to the VOL name for each created ST-BC set. By referring to the SAN configuration information 701, the manager processing portion 7 can determine the communication path length for each ST-BC set from the number of FC-SWs 71 existing between the port 31 having the specified SC port name and the port 600 having the specified BC port name. When a plurality of lengths is determined for a single ST-BC set (in other words, when a plurality of routes is determined), one length (for example, the shortest (that with the fewest FC-SWs), the longest, or a randomly selected length) may be used. The manager processing portion 7 can then set the order of precedence from the shortest communication path downward. Thus the "high speed" performance association information 81B is created. The other association information 81C and 81D may be generated using a similar method to that used to create the "high speed" performance association information 81B.

On the basis of the plurality of association information 81B to 81D and the weighting ratio information 81A1, the manager processing portion 7 is capable of creating the overall association information 81A2 shown in the example in FIG. 9A. A specific example of this will now be described.

The manager processing portion 7 is capable of determining an overall order of precedence for each of the ST-BC sets included in the plurality of association information 81B to 81D. For example, in accordance with the examples shown in FIGS. 8B and 9A, the manager processing portion 7 is capable of determining an overall order of precedence by setting the order of precedence at the best performance level "high speed" as a reference, and gradually reducing the order of precedence at the poorer performance levels "medium speed" and "low speed". More specifically, for example, when the order of precedence at "high speed" is (1, 2, 1, 3), the order of precedence at "medium speed" is (1, 2, 2, 1), and the order of precedence at "low speed" is (1, 2), the manager processing portion 7 can leave the order of precedence at "high speed" unchanged, lower the order of precedence at "medium speed" to (4, 5, 5, 4), and further lower the order of precedence at "low speed" to (6, 7).

From the weighting ratio information 81A1, the manager processing portion 7 is capable of specifying the weighting ratio of each performance level, and setting a weighting ratio which matches the performance level of each ST-BC set included in the plurality of association information 81B to 81D.

The manager processing portion 7 can multiply the set weighting ratio by the determined overall order of precedence for each ST-BC set, and set the resultant calculated value as the "priority value". The manager processing portion 7 may take the "priority value" into account when creating mapping information 87R in the mapping information group 87 to be described below.

Thus the overall association information 81A2 can be created. The "priority value" may be referred to as the overall order. That is, by referring to the overall association information 81A2, the overall order of all of the ST-BC sets existing in the storage control system according to this embodiment can be specified.

FIG. 9B shows a constitutional example of the mapping information group 87 included in the configuration information 11.

The mapping information group 87 comprises a "number of business APs", which is the number of business APs (for example, the number of business APs currently in execution) (x in the drawing is an integer). The mapping information group 87 also comprises the mapping information 87R of each business AP in a number corresponding to the number of business APs.

The mapping information 87R comprises information relating to an association between the business AP 4 and the information R thereof. This information comprises, for example, an "AP name" of the business AP 4, a "BVC name" of the business virtual computer 2 executing the business AP 4, a "BC name" of the business computer 17 comprising the business virtual computer 2, an "SVC name" of the storage virtual computer 61 which receives a request from the business virtual computer 2, a "VOL name" of the VOL 41 accessed by the storage virtual computer 61, an "ST name" of the storage 39 comprising the VOL 41, and a "condition" relating to the ST-BC set corresponding to the business AP 4.

On the basis of the overall association information 81A2 created according to the method described above, the manager processing portion 7 can create the mapping information 87R itself and the information elements included in the mapping information 87R. The manager processing portion 7 is capable of increasing the mapping information 87R itself or the information elements included in the mapping information 87R in accordance with a command to activate a business AP 4 in a business application $17^i$, for example, or decreasing the mapping information 87R itself or the information elements included in the mapping information 87R in accordance with a command to halt a business AP 4. The manager processing portion 7 is also capable of creating the mapping information 87R itself or the information elements included in the mapping information 87R on the basis of the policy information 13.

FIG. 10A shows a constitutional example of the policy information 13.

The policy information 13 may be input or updated through the display device 9, for example (a client machine, for example). The policy information 13 expresses a policy relating to services provided in relation to the business AP 4, for example. More specifically, for example, the policy information 13 may comprise, for each business AP 4, the "AP name" of the business AP 4, a "performance requirement" of the business computer 17 comprising the business AP 4 and/or the storages 39 that can be accessed by the business computer 17, a "required storage capacity" for storing the business AP 4, and service information relating to the services that may be applied to the business AP 4. The service information comprises, for example, a "disaster presence" indicating whether or not a "disaster recovery" service is to be applied, a "copying presence" indicating whether or not a "copying" service is to be applied, a "clustering presence" indicating whether or not a "clustering" service is to be applied, and a "storage presence" indicating whether or not a "storage" service is to be applied. Each type of service will be described below.

On the basis of the policy information 13, the manager processing portion 7 can create the mapping information 87R itself or the information elements included in the mapping information 87R.

A specific example of the procedure for creating the mapping information 87R will now be described.

Upon reception of a command to activate a certain business AP 4 on a certain business virtual computer 2, the business computer 17 is capable of transmitting its own "BC name", the "AP name" of the business AP 4 which is the subject of the activation command, and the "BVC name" of the business virtual computer 2 which received the activation command to the manager processing portion 7 of the management computer 5.

By referring to the overall association information 81A2 (see FIG. 9A) in the configuration information 11, the manager processing portion 7 can specify the one or more ST-BC sets corresponding to the received "BC name". By referring to the mapping information group 87, the manager processing portion 7 is capable of specifying, from among the one or more specified ST-BC sets, an ST-BC set as yet unused in any of the mapping information 87R which satisfies specific requirements (for example, the performance level of the business computer 17 having the received "BC name", the performance level of the business virtual computer 2 having the received "BVC name", or the performance requirement of the business AP 4 having the received "AP name"), i.e. the ST-BC set having the highest "priority value", for example. The manager processing portion 7 is then able to set the specified ST-BC set as the base ST-BC set of the business AP 4 that is the subject of the activation command (in so doing, new mapping information 87R can be created, and a single information element can be included in the mapping information 87R). In the example shown in FIG. 9B, the No. 1 information element is the information element of the base ST-BC set. The condition "operative" signifies that the base ST-BC set is in operation.

Next, by referring to the service information corresponding to the received "AP name" in the policy information 13, the manager processing portion 7 is able to determine the types of service that can be applied, and on the basis of the determination result, the manager processing portion 7 is able to include a new information element in the newly created mapping information 87R. In the example in FIG. 9B, the No. 2 information element expresses information relating to an ST-BC set after the "disaster recovery" service has been applied to the base ST-BC set (the ST-BC set indicated by the No. 1 information element). The No. 3 information element expresses information relating to an ST-BC set after the "copying" service has been applied to the base ST-BC set. The No. 4 information element expresses information relating to an ST-BC set after the "clustering" service has been applied to the base ST-BC set. The No. 5 information element expresses information relating to an ST-BC set after the "storage" service has been applied to the base ST-BC set. The condition "set" indicates that the ST-BC set is not yet operative following the application of a service, but may be operated.

Thus one set of the mapping information 87R may be created. By referring to the mapping information 87R, the manager processing portion 7 is able to execute the services "disaster recovery", "copying", "clustering", and "storage". Furthermore, when the mapping information 87R has been created, the manager processing portion 7 can associate (add, for example) predetermined information (for example, information expressing which business AP 4 having which "AP name" has been activated on which business virtual computer 2 having which "BVC name") with (to) the BC information elements 86R of the BC information 86 in relation to the business computer 17 which activates the business AP 4 corresponding to the mapping information 87R. Note that the manager processing portion 7 may associate data expressing which information element relates to which service with each information element of the mapping information 87R.

FIG. 10B shows a constitutional example of the management information 703 that can be set in the management computer 5.

The management information 703 may be constructed from the SC information 84 and SC management information 85 in the configuration information 11, and the SAN configuration information 701, for example. The management information 703 indicates the business computer 17 that is the transmission destination of the management information 703, and the communication path between this business computer 17 and the storage control device 27, for example. More specifically, for example, the management information 703 comprises, for each communication path, an "SC name" of the storage control device 27 serving as the access destination of the business computer 17, an "access destination port name" (port name of the SC port) of the port serving as the access destination of the storage control device 27, an "access source port name" (port name of the BC port) of the port serving as the access source, and a "VOL name" of the VOL 41 serving as the access destination.

By referring to the management information 703, the business virtual computer 2 created in the business computer 17 is able to learn which logical volume 41 can be accessed from which BC port 600 via which SC port 31 of which storage control device 27.

The various elements of the storage control system according to this embodiment were described above.

In this embodiment, the management computer 5 is capable of monitoring a predetermined element in the storage control system. More specifically, for example, the manager processing portion 7 of the management computer 5 is capable of determining whether each business computer 17 or each storage control device 27 is operative or has a fault according to whether or not a response is received from the business computer 17 or storage control device 27. The manager processing portion 7 can then execute the "disaster recovery", "copying", "clustering", or "storage" services in accordance with the determination result, for example. Each of these services will now be described.

FIG. 10C shows an example of the execution of the "disaster recovery" service.

For example, when no response is received from either the business computer 17A or the storage control device 27A existing on a certain site, the manager processing portion 7 refers to the mapping information 87R of the business AP 4 in the business computer 17, and if an information element relating to the ST-BC set following application of the "disaster recovery" service is included in the mapping information 87R, the manager processing portion 7 can execute the "disaster recovery" service on the basis of the information element (the No. 2 information element in FIG. 9B, for example) and other information in the configuration information 11.

Specifically, for example, the manager processing portion 7 causes the business computer 17D to execute a similar business AP 4A and business virtual computer 2A to those of the business computer 17A at the site in which the fault has occurred (the fault site hereafter). More specifically, for example, the manager processing portion 7 can generate the business virtual computer 2A in the business computer 17D by generating in the business computer 17D a business virtual computer allocated similar resources to those of the business computer 17A. Further, for example, the manager processing portion 7 can cause the business virtual computer 2A to execute the business AP 4A by transmitting the business AP 4A to the business computer 17D, or allocating the VOL 41 storing the business AP 4A to the business virtual computer 2A generated in the business computer 17D.

The manager processing portion 7 is also capable of executing, in a storage control device 27W at the site of the moving destination, the storage virtual computer 61A executed in the storage virtual device 27A at the fault site using a similar method to that employed to execute the business virtual computer 2A in the business computer 17D.

Further, although not shown in the drawing, the manager processing portion 7 is capable of copying the VOL 41A (the VOL 41A serving as the access destination of the business virtual computer 2A) in the storage 39A into a storage of another site at the same timing or a different timing to the timing at which the VOL 41A is updated, for example. When a fault occurs at the site comprising the storage 39A, the manager processing portion 7 can generate a VOL 41H, which is a copy of the VOL 41A at the time of fault occurrence, by copying the VOL copied into the storage of the other site into the storage 39D at the aforementioned moving destination site.

An example of the execution of the "disaster recovery" service was described above. With this service, all of the business virtual computer 2, storage virtual computer 61, and VOL 41 relating to the business AP 4A are moved or copied.

Note that the manager processing portion 7 is capable of issuing a request to open a communication path to the storage management processing portion 25 of the business computer 17D. In so doing, the manager processing portion 7 can cause the storage management processing portion 25 to set a communication path comprising the BC port, not shown in the drawing, of the business computer 17D, an SC port 31W, the storage virtual computer 61A, an I/F 35W, and the VOL 41H. By opening a communication path corresponding to the post-copying or post-moving configuration when moving or copying at least one of the business AP 4, business virtual computer 2, storage virtual computer 61, and VOL 41 as described above, information can be exchanged between the business virtual computer 2 and VOL 41 on the basis of the post-copying or post-moving configuration.

Figure 11A:
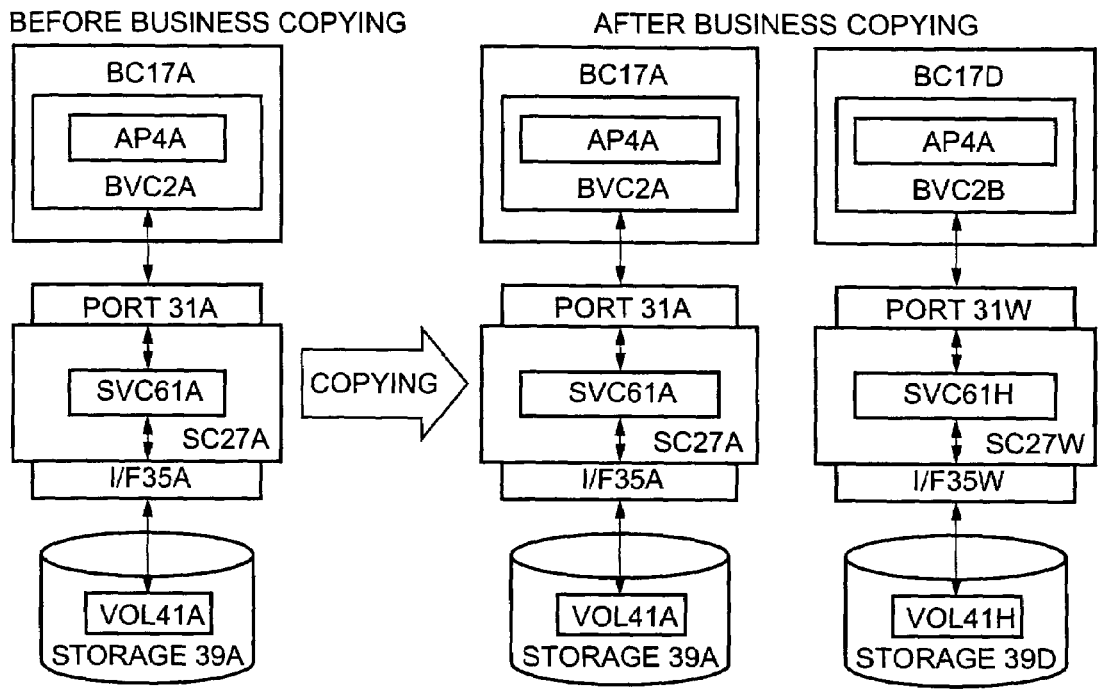
FIG. 11A shows an example of the execution of a "copying" service.

FIG. 11A shows an example of the execution of the "copying" service.

When a predetermined condition (an irregularity or overload, for example) is detected in the storage control system, for example, the manager processing portion 7 can execute the "copying" service on the storage 39, storage control device 27, and so on involved in the condition. Specifically, for example, the manager processing portion 7 refers to the mapping information 87R of the business AP 4 in the business computer 17A existing at a certain site, and if an information element relating to the ST-BC set following application of the "copying" service is included in the mapping information 87R, the manager processing portion 7 can execute the "copying" service on the basis of this information element (the No. 3 information element in FIG. 9B, for example) and other information in the configuration information 11. More specifically, the copying shown in the example in FIG. 11A can be executed on the business computer 17A, storage control device 27A, and storage 39A, for example, by means of similar processing to that performed during execution of the "disaster recovery" service.

An example of the execution of the "copying" service was described above. With this service, all of the business virtual computer 2, storage virtual computer 61, and VOL 41 relating to the business AP 4A are copied.

Figure 11B:
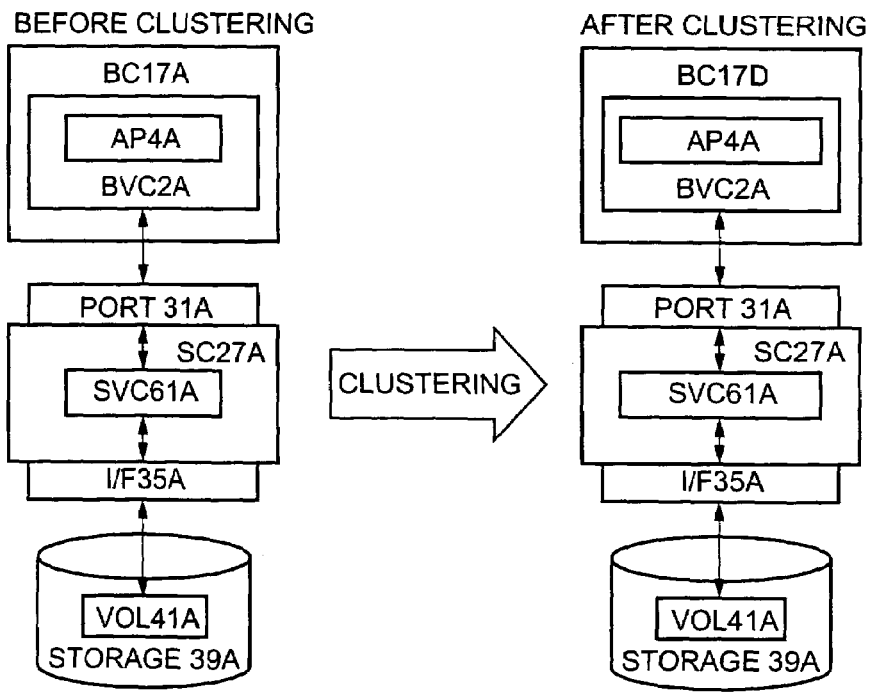
FIG. 11B shows an example of the execution of a "clustering" service.

FIG. 11B shows an example of the execution of the "clustering" service.

When a predetermined condition (an irregularity or overload, for example) is detected in the storage control system, for example, the manager processing portion 7 can execute the "clustering" service on the business computer 17 involved in the condition. Specifically, for example, the manager processing portion 7 refers to the mapping information 87R of the business AP 4 in the business computer 17A existing at a certain site, and if an information element relating to the ST-BC set following application of the "clustering" service is included in the mapping information 87R, the manager processing portion 7 can execute the "clustering" service on the basis of this information element (the No. 4 information element in FIG. 9B, for example) and other information in the configuration information 11. More specifically, the "clustering" service shown in the example in FIG. 11B can be executed on the business computer 17A, for example, by means of similar processing to that performed during execution of the "disaster recovery" service.

An example of the execution of the "clustering" service was described above. With this service, only the business virtual computer 2 relating to the business AP 4A is moved or copied, whereas the storage virtual computer 61 and VOL 41 are neither moved nor copied.

Figure 12A:
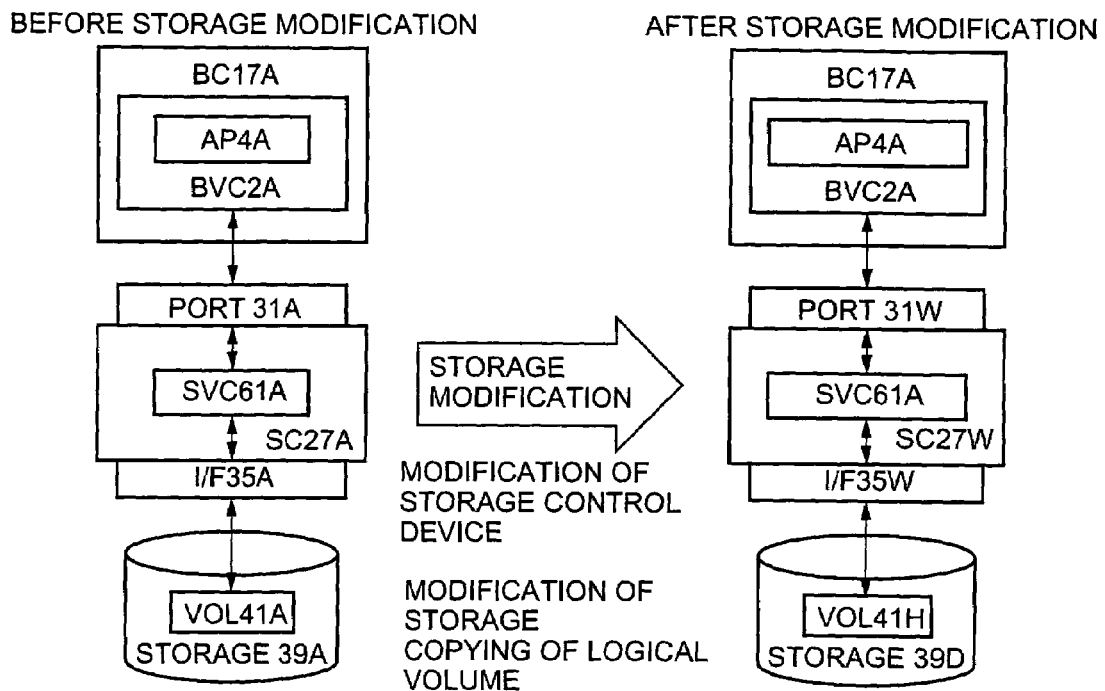
FIG. 12A shows an example of the execution of a "storage" service.

FIG. 12A shows an example of the execution of the "storage" service.

When a predetermined condition (an irregularity or overload, for example) is detected in the storage control system, for example, the manager processing portion 7 can execute the "storage" service on the storage 39 and storage control device 27 involved in the condition. Specifically, for example, the manager processing portion 7 refers to the mapping information 87R of the business AP 4 in the business computer 17A existing at a certain site, and if an information element relating to the ST-BC set following application of the "storage" service is included in the mapping information 87R, the manager processing portion 7 can execute the "storage" service on the basis of this information element (the No. 5 information element in FIG. 9B, for example) and other information in the configuration information 11. More specifically, the "storage" service shown in the example in FIG. 12A can be executed on the storage control device 27A and storage 39A, for example, by means of similar processing to that performed during execution of the "disaster recovery" service (specifically, for example, by generating an identical virtual computer 61A to the storage virtual computer 61A of the storage control device 27A in the storage control device 27W).

An example of the execution of the "storage" service was described above. With this service, the business virtual computer 2 relating to the business AP 4A is neither moved nor copied, whereas the storage virtual computer 61 and VOL 41 are both moved or copied.

When the various services described above (for example, the "storage" service shown in the example in FIG. 12A) are executed, information (for example, the port queue or I/F queue and the information elements accumulated therein) can be exchanged using the method described below.

Figure 12B:
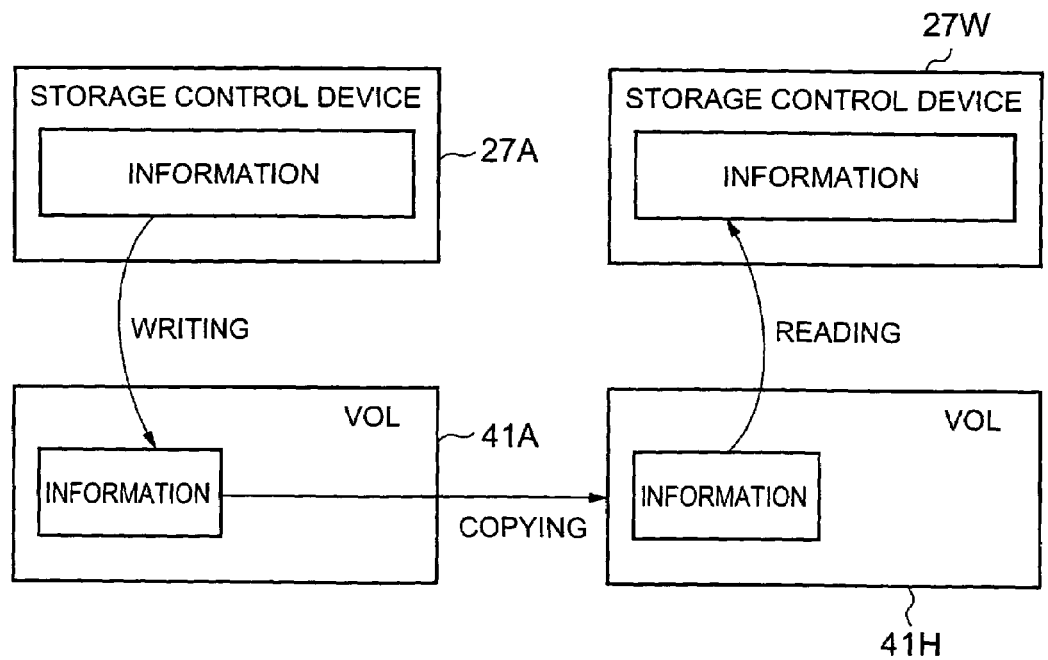
FIG. 12B shows an example of an information exchange method, employing as an example a case in which information is passed from a storage control device 27A to a storage control device 27W.

FIG. 12B shows an example of an information exchange method, employing as an example a case in which information is passed from the storage control device 27A to the storage control device 27W.

For example, when the storage control device 27A receives an instruction from the manager processing portion 7 to transfer information to the storage control device 27W, the storage control device 27A is able to write information relating to itself (for example, information relating to the resources allocated to the storage virtual computer 61A, the SC information elements 84R, and the SC management information elements 85R) into the VOL 41A that can be accessed by the storage virtual computer 61A provided in the storage control device 27A.

Further, for example, upon reception from the manager processing portion 7 of the VOL name of the VOL 41H serving as the copy destination, for example, the storage control device 27A is able to copy the information stored in the VOL 41A from the VOL 41A into the VOL 41H.

Upon reception of a specific instruction (for example, notification of the "VOL name" of the VOL 41H and a command to read information from the VOL 41H) from the manager processing portion 7, for example, the storage control device 27W is able to read the information from the copy destination VOL 41H. Then, on the basis of the information elements included in the information, the storage control device 27W can perform various settings (for example, setting the storage virtual computer 61A)

The various services and information exchange were described above.

Next, an example of the flow of the various processes performed in this embodiment will be described.

Figure 13:
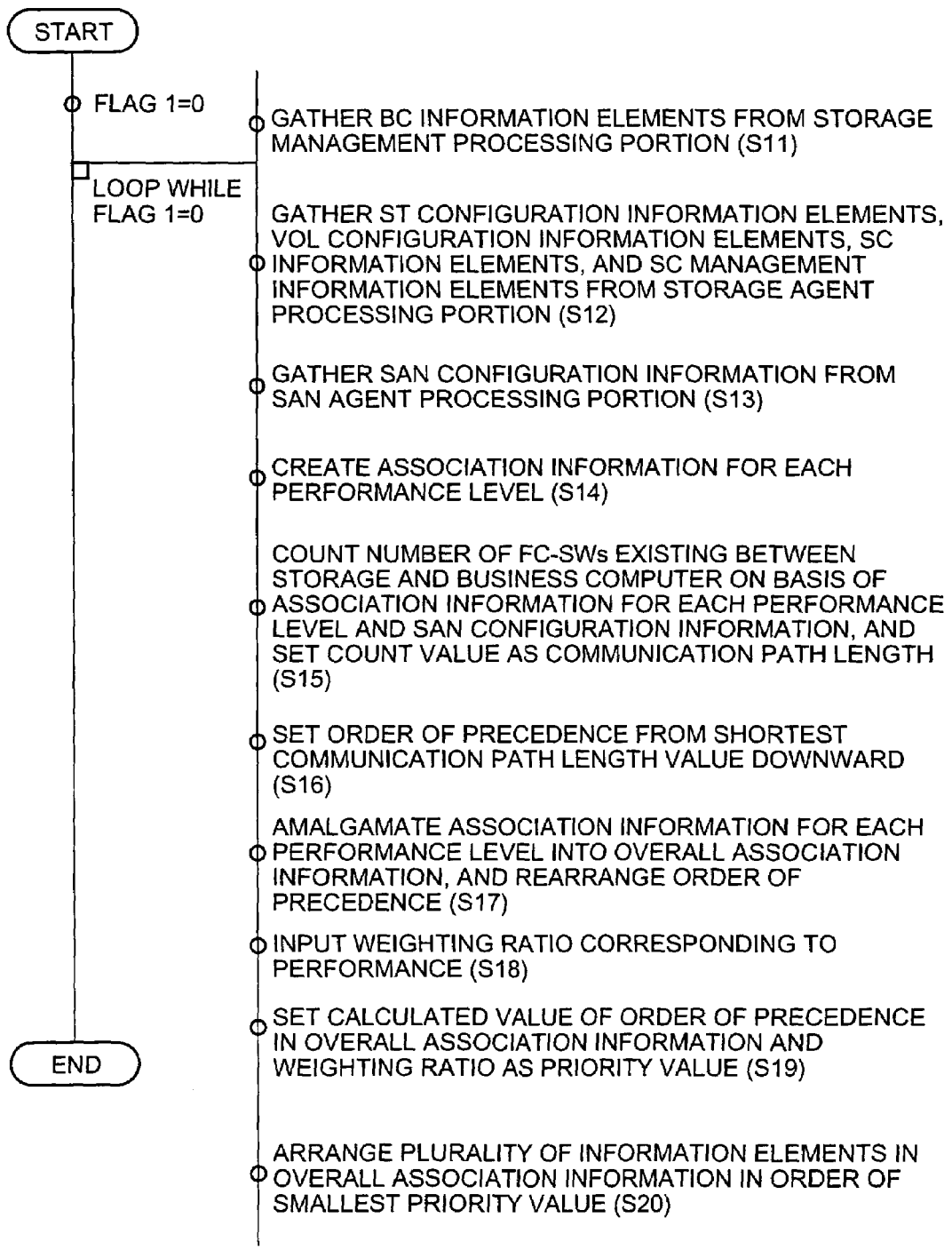
FIG. 13 shows an example of processing performed by a manager processing portion 7 to generate the combination information 81 in the configuration information 11.

FIG. 13 shows an example of processing performed by the manager processing portion 7 to create the combination information 81 in the configuration information 11.

The manager processing portion 7 is capable of gathering the BC information elements 86R (in addition to the information described above, the IP address of each business computer 17 and/or each business virtual computer 2 inside the business computers 17 may be included) from the storage management processing portion 25 of each business computer 17 (step S11).

The manager processing portion 7 is also capable of gathering the ST configuration information elements 82R, VOL configuration information elements 83R, SC information elements 84R, and SC management information elements 85R from the storage agent processing portion 282 of each storage control device 27 (S12).

The manager processing portion 7 can gather the SAN configuration information 701 from the SAN agent processing portion 23 (S13).

On the basis of the various gathered information elements, the manager processing portion 7 is able to classify the storages 39 and business computers 17 according to performance level, and on the basis of the classification result, the manager processing portion 7 is able to create the various performance association information 81B to 81D (see FIG. 8B) (S14).

On the basis of the performance association information 81B to 81D for each performance level and the SAN configuration information 701, the manager processing portion 7 is able to count the number of FC-SWs 71 existing between the storages 39 and business computers 17, and set the count value (the smallest value when there is a plurality of variations, for example) as the communication path length (S15). The manager processing portion 7 is then able to set the order of precedence for each type of association information 81B to 81D from the shortest communication path downward (S16).

The manager processing portion 7 is able to amalgamate the plurality of association information 81B to 81D into the single set of overall association information 81A2 (see FIG. 9A) and, using the method described above, rearrange the order of precedence for each type of association information 81B to 81D into an overall order of precedence (S17). By referring to the weighting ratio information 81A1, the manager processing portion 7 is able to specify the weighting ratio of each performance level, and associate the specified weighting ratios with the ST-BC sets having the performance level corresponding to the weighting ratio (S18). The manager processing portion 7 is then able to determine an integrated value of the overall order of precedence and the associated weighting ratio for each ST-BC set in the overall configuration information $81A2^{ii}$, and set the determined integrated value as the priority value (S19). The manager processing portion 7 can then arrange the plurality of information elements in the overall association information 81A2 in order from the smallest priority value (S20).

By means of this processing, the manager processing portion 7 is able to create the combination information 81. Note that when the processing of S20 is complete, the manager processing portion 7 may set a flag 1 to P and drop out of the loop. Further, the manager processing portion 7 may set the flag 1 to Q (a value other than P, for example zero) at a predetermined timing after setting the flag 1 to P to begin the processing from S11. This applies likewise to the flags illustrated in the drawings following FIG. 13.

Figure 14A:
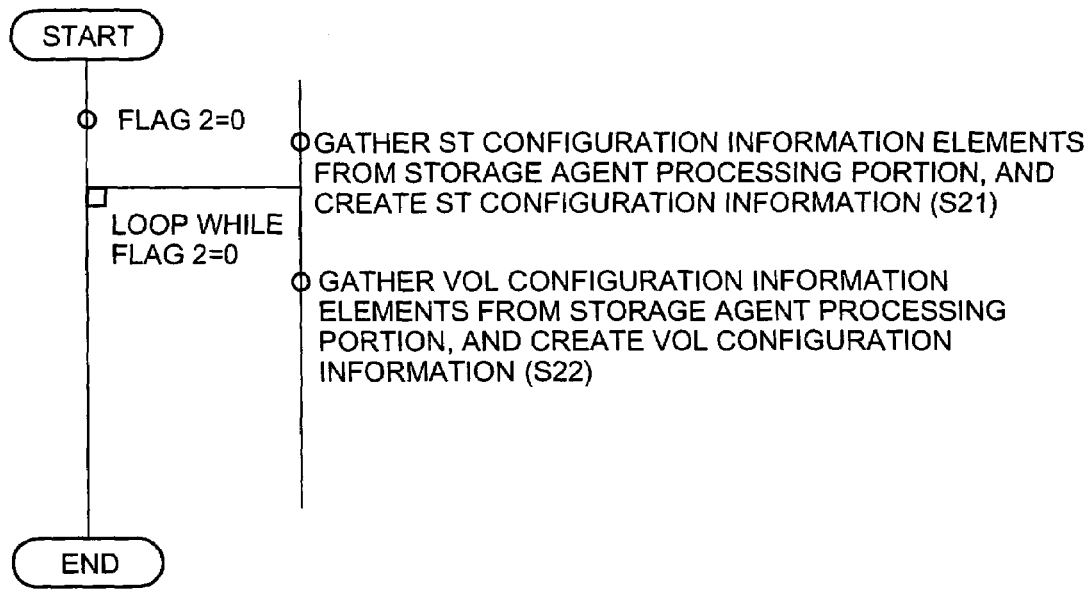
FIG. 14A shows an example of processing performed by the manager processing portion 7 to generate the ST configuration information 82 and VOL configuration information 83 in the configuration information 11.

FIG. 14A shows an example of processing performed by the manager processing portion 7 to create the ST configuration information 82 and VOL configuration information 83 in the configuration information 11.

The manager processing portion 7 is able to gather the ST configuration information elements 82R from the storage agent processing portion 282 of each storage control device 27, and create the ST configuration information 82 comprising the gathered information elements 82R (S21).

Further, the manager processing portion 7 is able to gather the VOL configuration information elements 83R from the storage agent processing portion 282 of each storage control device 27, and create the VOL configuration information 83 comprising the gathered information elements 83R (S22).

By means of this processing, the manager processing portion 7 is able to create the ST configuration information 82 and VOL configuration information 83.

Figure 14B:
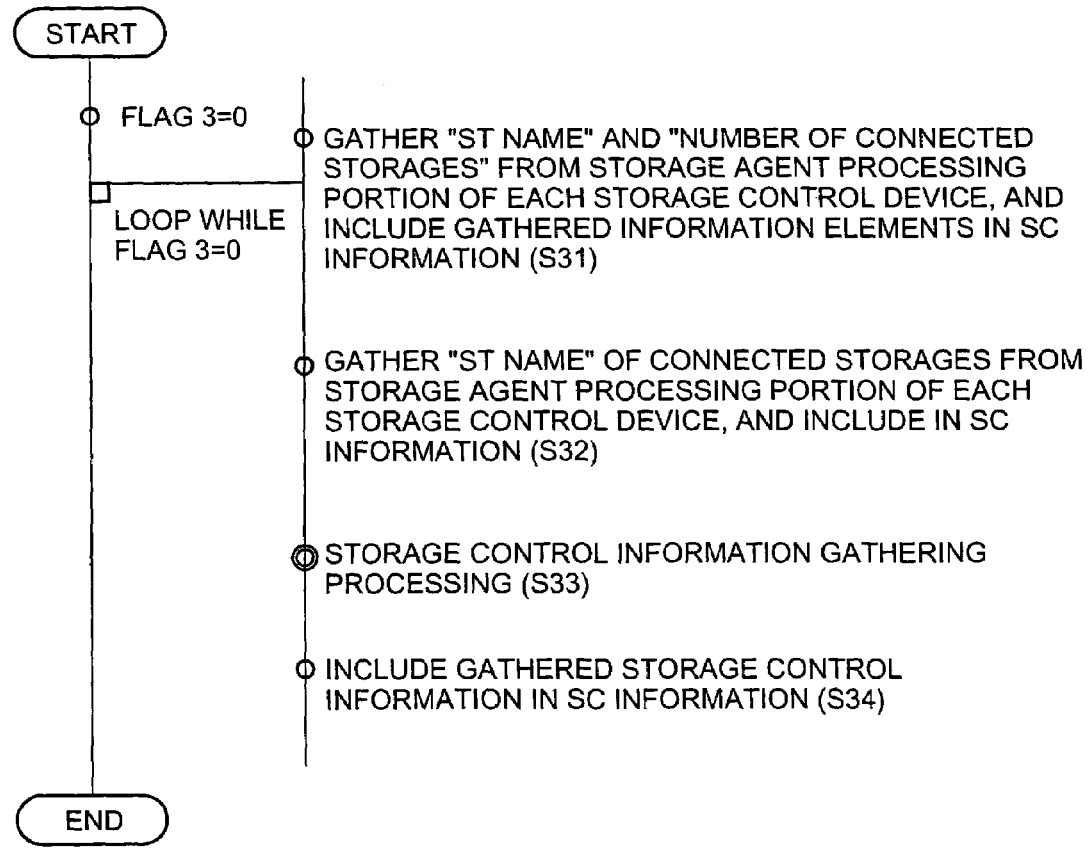
FIG. 14B shows an example of processing performed by the manager processing portion 7 to generate the SC information 84 in the configuration information 11.

FIG. 14B shows an example of processing performed by the manager processing portion 7 to create the SC configuration information 84 in the configuration information 11.

The manager processing portion 7 is able to gather the "SC name" and "number of connected storages" from the storage agent processing portion 282 of each storage control device 27, and include these elements in the incomplete SC information 84 (S31).

Further, the manager processing portion 7 is able to gather the "ST name" of each storage 39 connected to each storage control device 27 from the storage agent processing portion 282 of each storage control device 27, and include the gathered "ST names" in the incomplete SC information 84 (S32).

By means of the processing shown in the example in FIG. 15A, the manager processing portion 7 is able to gather storage control information (S33), and include the gathered storage control information in the incomplete SC information 84 (S34).

By means of this processing, the manager processing portion 7 is able to create the SC information 84.

FIG. 15A shows an example of the storage control information gathering processing performed in S33 of FIG. 14B.

The manager processing portion 7 is able to gather the number of loaded ports, number of loaded I/Fs, number of SVCs, number of loaded CPUs, and loaded memory capacity from the storage agent processing portion 282 of each storage control device 27 (S33-1).

Further, the manager processing portion 7 is able to gather the loaded port information and loaded I/F information from the storage agent processing portion 282 of each storage control device 27 (S33-2 and S33-3).

Further, the manager processing portion 7 is able to gather virtual computer information from the virtual computer processing portion 93 via the storage agent processing portion 282 (S33-4).

Figure 15B:
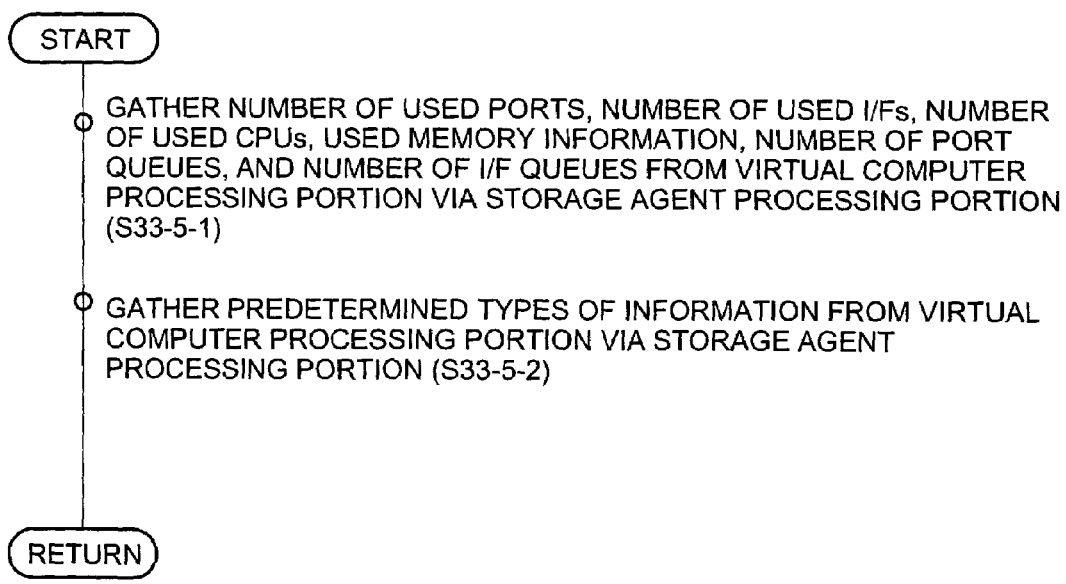

When it is determined that virtual computer detailed information is present in the virtual computer information, the manager processing portion 7 is able to execute virtual computer detailed information gathering processing, shown in the example in FIG. 15B (S33-5), and set the "presence of detailed information" in the virtual computer information to "present" (S33-6).

On the other hand, when it is determined that the virtual computer information does not include virtual computer detailed information, the manager processing portion 7 is able to set the "presence of detailed information" in the virtual computer information to "absent" (S33-7).

FIG. 15B shows an example of the virtual computer detailed information gathering processing performed in S33-5 of FIG. 15A.

The manager processing portion 7 is able to gather the number of used ports, number of used I/Fs, number of used CPUs, used memory information, port queue information, and I/F queue information from the virtual computer processing portion 93 via the storage agent processing portion 282 (S33-5-1).

Further, the manager processing portion 7 is able to gather other predetermined types of information from the virtual computer processing portion 93 via the storage agent processing portion 282 (S33-5-2). Here, the information that may be gathered may include at least one of used port information (for example, the "port name" of each used port), used I/F information (for example, the "I/F name" of each used I/F), used CPU information (for example, the "CPU name" and "CPU usage proportion" of each used CPU), port queue information (for example, the "port queue name", "used port name", and "number of queues"), and I/F queue information (for example, the "I/F queue name", "used I/F name" and "number of queues"), for example.

By means of the processing shown in FIGS. 14B to 15B, the SC information 84 can be completed.

FIG. 16 shows an example of the processing performed by the storage agent processing portion 282.

The storage agent processing portion 282 receives a request (S41).

In S41, an information gathering request is received from the manager processing portion 7 (S42), and when the subject of the gathering request is the ST configuration information 82R, the storage agent processing portion 282 can transmit the ST configuration information elements 82R to the manager processing portion 7 (S44). When the subject of the gathering request in S42 is the VOL configuration information elements 83R, the storage agent processing portion 282 can transmit the VOL configuration information elements 83R to the manager processing portion 7 (S45). When the subject of the gathering request in S42 is the SC information elements 84R, and more specifically information relating to the number of SVCs and virtual computer information in the SC information elements 84R, the storage agent processing portion 282 can gather this information from the virtual computer processing portion 93 and transmit the information to the manager processing portion 7 (S46). If the subject of the request is all of the SC information elements 84R, the storage agent processing portion 282 can transmit the SC information elements 84R* to the manager processing portion 7 (S47).

When a virtual computer control request is received from the manager processing portion 7 in S41 (S43), the storage agent processing portion 282 is capable of causing the virtual computer processing portion 93 to execute control of the storage virtual computers 61 (S48).

FIG. 17 shows an example of the processing performed by the virtual computer processing portion 93.

Upon reception of a virtual computer generation request, for example, from the storage agent processing portion 282, the virtual computer processing portion 93 is able to generate the storage virtual computer 61 (S51). More specifically, for example, the manager processing portion 7 is capable of determining the availability of the resource pool 26 of each storage control device 27 from the SC information elements 84R in the SC information 84, and commanding the storage agent processing portion 282 to generate the storage virtual computer 61, allocated all or a part of the available resource pool 26, in accordance with the determination result (the storage agent processing portion 282 may be commanded not only to generate the storage virtual computer 61, but also to delete it, modify its conditions, copy it, or move it). In accordance with the command, the storage agent processing portion 282 can transmit a virtual computer generation request to the virtual computer processing portion 93. The virtual computer processing portion 93 can input the port 31, I/F 37, CPU 33, memory 35, and priority condition (notified by the manager processing portion 7 via the storage agent processing portion 282, for example) to be allocated to the storage virtual computer 61 (S56), generate the storage virtual computer 61 in accordance with the input conditions, and allocate the port 31, I/F 37, CPU 33, memory 35, and priority information 94 from the resource pool (in other words, the actual resources) 26 in accordance with the input conditions (S57).

When a virtual computer deletion request is received from the storage agent processing portion 282, for example, the virtual computer processing portion 93 can delete the storage virtual computer 61 (S52). More specifically, for example, the virtual computer processing portion 93 can input the virtual computer information (the SVC name, for example) to be deleted (S58), delete the storage virtual computer 61 which matches the input information, and release the allocated port 31, I/F 37, CPU 33, and memory 35 (S59).

When a virtual computer condition modification request is received from the storage agent processing portion 282, for example, the virtual computer processing portion 93 can modify the conditions of the storage virtual computer 61 (S53). More specifically, for example, the virtual computer processing portion 93 can input specification of the storage virtual computer 61 (the SVC name, for example) to be subjected to condition modification and all or a part of the virtual computer information following the modification (S58), and update the virtual computer information of the specified storage virtual computer 61 to the input virtual computer information (S61). At this time, when modifying the port or I/F allocation, for example, the virtual computer processing portion 93 notifies the queue control processing portion 409 of the allocation or release of the modified portion of the port queue 51 or I/F queue 53 (S62)

Upon reception of a virtual computer copying request from the storage agent processing portion 282, for example, the virtual computer processing portion 93 can execute copying of the storage virtual computer 61 (S54). More specifically, for example, the virtual computer processing portion 93 can input the virtual computer information of the storage virtual computer 61 to be copied (S63), and generate a copy of the storage virtual computer 61 in accordance with the input virtual computer information (S64). At this time, when the location (the VOL name, for example) of the information to be set in the copy is specified, for example, the virtual computer processing portion 93 can read the information (for example, the allocation relationship between the port queue 51 or I/F queue 53 and the ports 31 or I/Fs 37, as well as the information elements accumulated in the queue 51 or 53) from the specified location, and set the read information in the copy of the storage virtual computer 61 (S65).

Upon reception of a storage control request from the storage agent processing portion 282, the virtual computer processing portion 93 is able to execute the processing shown in the example in FIG. 18 (S66).

FIG. 18 shows an example of the storage control processing executed by the virtual computer processing portion 93.

Upon reception of a request from the storage agent processing portion 282 to generate a logical volume 41, for example, the virtual computer processing portion 93 can generate the logical volume 41 (S66-1). More specifically, for example, the virtual computer processing portion 93 can generate the specified logical volume 41 in the specified storage 39 (S66-2) Upon reception of a request from the storage agent processing portion 282 to delete the logical volume 41, for example, the virtual computer processing portion 93 can delete the logical volume 41 (S66-3). More specifically, for example, the virtual computer processing portion 93 can delete the specified logical volume 41 from the specified storage 39 (S66-4).

Upon reception of a request from the storage agent processing portion 282 to generate a copy of the logical volume 41, for example, the virtual computer processing portion 93 can copy the logical volume 41 (S66-5). More specifically, for example, the virtual computer processing portion 93 can copy the content of the specified logical volume 41 into another specified logical volume 41 of the specified storage 39 (S66-6) Upon reception of a request from the storage agent processing portion 282 to move the logical volume 41, for example, the virtual computer processing portion 93 can move the logical volume 41 (S66-7). More specifically, for example, the virtual computer processing portion 93 can move the content of the specified logical volume 41 to another logical volume 41 in the specified storage 39 (S66-8).

Upon reception of a request from the storage agent processing portion 282 to modify the logical volume 41, for example, the virtual computer processing portion 93 can modify the storage capacity of the logical volume 41* (S66-9). More specifically, for example, the virtual computer processing portion 93 can modify the VOL capacity of the specified logical volume 41 to the specified VOL capacity (S66-10). At this time, the virtual computer processing portion 93 can also update the VOL configuration information elements 83R, for example.

FIG. 19 shows an example of processing performed by the storage management processing portion 25 of the business computer 17.

When an information gathering request is received from the manager processing portion 7 (S71), the storage management processing portion 25 is capable of transmitting the BC information elements 86R to the manager processing portion 7 (S72). If the business virtual computer 2 exists at this time, the storage management processing portion 25 can transmit the BVC name of the business virtual computer 2 to the manager processing portion 7 (S73). Furthermore, if the business AP 4 exists at this time, the storage management processing portion 25 can transmit the AP name of the business AP 4 to the manager processing portion 7 (S74).

When a control request is received from the manager processing portion 7 (S75) and the request is to open a communication path between the business computer 17 and VOL 41 (S76), the storage management processing portion 25 can receive the VOL name, the access destination port name, and the SC name from the manager processing portion 7 (S77). The storage management processing portion 25 can then obtain, from the one or more BC ports 600, the BC port name of the BC port 600 that can be allocated (in other words, the access source port name) (S78). The storage management processing portion 25 can then open the communication path by recording the communication path information, comprising the input VOL name, access destination port name, and SC name, and the obtained access source port name, in the management information 703 (see FIGS. 2 and 10B) (S79).

If the request in S75 is to release a communication path (S80), the storage management processing portion 25 can release the communication path by deleting the information elements corresponding to the communication path that is the subject of the release request from the management information 703 (S81) If the request in S75 is for virtual computer processing (S82), the storage management processing portion 25 can execute the processing shown in the example in FIG. 20 (S83).

FIG. 20 shows an example of the virtual computer control processing executed by the storage management processing portion 25.

Upon reception of a virtual computer generation request from the manager processing portion 7, for example, the storage management processing portion 25 is able to generate the business virtual computer 2 (S91). More specifically, for example, the storage management processing portion 25 can input the resource conditions to be allocated to the business virtual computer 2, and generate the business virtual computer 2 in accordance with the input conditions (S92). If the business AP 4 is to be activated at this time, the storage management processing portion 25 can activate the business AP 4 in the business virtual computer 2 (S93).

Upon reception of a virtual computer deletion request from the manager processing portion 7, for example, the storage management processing portion 25 is able to delete the business virtual computer 2 (S94). More specifically, when the business AP 4 is in operation in the business virtual computer 2 that is the subject of the deletion request, for example, the storage management processing portion 25 is able to halt the business AP 4 (S95), and then delete the business virtual computer 2 that is the subject of the deletion request (S96).

Upon reception of a virtual computer condition modification request from the manager processing portion 7, for example, the storage management processing portion 25 is able to modify the conditions of the business virtual computer 2 (S97) More specifically, for example, the storage management processing portion 25 can check the resource allocation condition of the business virtual computer 2 to be subjected to condition modification (S98), input the post-modification conditions (resource-related conditions, for example), and then allocate to the business virtual computer 2 resources that are different to those of the current resource allocation condition or release the allocation of resources to the business virtual computer 2 (S99).

Upon reception of a virtual computer moving request from the manager processing portion 7, for example, the storage management processing portion 25 is able to move the business virtual computer 2 (S100). More specifically, for example, the storage management processing portion 25 can input virtual computer conditions (the resource conditions of the business virtual computer 2 to be moved, for example) to be input into the business computer 17 which is the destination of the business virtual computer 2, and transmit a control request for generating the business virtual computer 2 so as to match the input conditions to the manager processing portion 7 (or the storage management processing portion 25 of the destination business computer 17) (S101A). Further, for example, the storage management processing portion 25 can transmit a deletion request for deleting the business virtual computer 2 to be moved to the manager processing portion 7 (or delete the business virtual computer 2 and notify the manager processing portion 7 that the business virtual computer 2 has been deleted) (S101B).

Upon reception of a virtual computer copying request from the manager processing portion 7, for example, the storage management processing portion 25 is able to generate a copy of the business virtual computer 2 (S102). More specifically, for example, the storage management processing portion 25 can input virtual computer conditions (the resource conditions of the business virtual computer 2 to be copied, for example) to be input into the business computer 17 which is the copying destination of the business virtual computer 2, and transmit a control request for generating the business virtual computer 2 so as to match the input conditions to the manager processing portion 7 (or the storage management processing portion 25 of the copying destination business computer 17) (S103).

According to this embodiment, as described above, the management computer 5 is capable of performing control on each storage control device 27 such as generating, deleting, copying, and modifying the conditions of the storage virtual computer 61 on the basis of the condition of the resource pool 26 of the storage control device 27, obtained from the SC information 84. The storage virtual computer 61 generated in the storage control device 27 is capable of accessing the accessible logical volumes 41 in response to an access request from the business computer 17.

Also according to the embodiment described above, combinations of the storages 39 and business computers 17 may be determined on the basis of the performance of the storage 39 and the performance of the business computer 17. Each combination may be allotted a priority value based on the length of the communication path between the storage 39 and business computer 17 constituting the combination, and the weighting ratio of each performance level. When the business AP 4 is to be activated, the combination comprising the business computer 17 that is to execute the business AP 4 is allocated to the business AP 4 to be activated on the basis of the performance level of the business computer 17 commanded to activate the business AP 4 and the priority value of each combination corresponding to that performance level. In so doing, the storage virtual computer 61 that is capable of accessing the storage 39 in the allocated combination can process access requests from the business AP 4. As a result, use of the resources of the business computer 17 and/or the storage control device 27 is improved in efficiency.

Also according to the embodiment described above, the storage virtual computer 61 and the logical volume 41 that can be accessed thereby may be formed into a set and copied or moved. As a result, business data availability is improved.

An embodiment of the present invention was described above, but this embodiment is merely an example provided to illustrate the present invention, and there is no intention to limit the scope of the present invention to this embodiment alone. The present invention may be implemented in various other embodiments.

For example, when allocating the storage virtual computer 61 to the storage 39 having the highest performance level ("high speed" performance, for example), the manager processing portion 7 may allocate a larger portion of the resources thereto than to the storage virtual computers 61 corresponding to the storages 39 having poorer performance.

Further, for example, the manager processing portion 7 may refer to resource allocation policy information, expressing the association between the performance level and the amount of resources allocated to the virtual computers 2, 61, and issue a request to generate the virtual computers 2, 61 on the basis of this information.

Further, when moving or copying at least one of the storage virtual computer 61, logical volume 41, and business virtual computer 2 (referred to collectively as the "logical subject" hereafter for convenience), for example, the manager processing portion 7 may determine whether or not the logical subject can be moved or copied. More specifically, for example, the manager processing portion 7 may specify the amount of resources required by the logical subject by referring to the appropriate information elements (information elements relating to the logical subject) in the configuration information 11, specify the amount of available resources at the movement destination or copy destination by referring to the appropriate information elements (information elements relating to the movement destination or copy destination) in the configuration information 11, and then determine whether or not at least the amount of resources required by the logical subject is available. When an affirmative determination result is obtained, the manager processing portion 7 may execute movement or copying of the logical subject in accordance with the mapping information 87R.

If, on the other hand, a negative determination result is obtained, the manager processing portion 7 may execute processing to create the amount of available resources required to move or copy the logical subject at the movement destination or copy destination corresponding to the mapping information 87R. More specifically, for example, the manager processing portion 7 may search for a usable combination from the association information 81B, 81C, or 81D (see FIG. 8B) corresponding to the performance level of the logical subject (for example, a status indicating unused or in use may be set in the combinations of the association information 81B, 81C, and 81D such that the usability of each combination can be determined from this status) When the manager processing portion 7 finds a usable combination, the combination may be allocated to the logical subject, and if no usable combination is found, a usable combination may be searched for from the overall association information 81A2 (see FIG. 9A). If, for example, the manager processing portion 7 can find only a combination having the performance level "low speed", which is lower than the performance level "high speed" of the logical subject, the manager processing portion 7 is able to perform the following processing to allocate a combination which matches the performance level "high speed" of the logical subject most closely. For example, the manager processing portion 7 may search the overall association information 81A2 for a combination having the "medium speed" performance level and using at least the amount of resources required by the "high speed" performance logical subject, then search the overall information 81A2 for an unused combination having the "low speed" performance level and requiring at least the amount of resources required by the logical subject relating to the found "medium speed" combination, and then move the logical subject relating to the found "medium speed" combination to the found, unused "low speed" combination so as to make the resources used by the "medium speed" combination available. The manager processing portion 7 can then allocate the logical subject pertaining to the "high speed" combination, which is the movement or copying subject, to the available resources. By means of this method, the manager processing portion 7 is able to create available resources in accordance with the constructed combination information 81.

The invention claimed is:

1. A storage control method comprising the steps of:
referring to resource information relating to the usage condition of at least one hardware resource from among one or more storage control devices connected communicably to at least one of a plurality of storage devices;
specifying an unused part of said hardware resource from said resource information;
allocating a storage virtual computer, which serves as a virtual computer to which all or a part of said specified unused part is allocated, to at least one of said one or more storage control devices;
referring to host information, which is information expressing a performance level of each host device of a plurality of host devices, and referring to storage device information, which is information expressing a performance level of each storage device of said plurality of storage devices;
specifying a plurality of combinations of said host device and said storage device based on said performance level of each host device and said performance level of each storage device, specified from said host information and said storage device information;
attaching an order of precedence to each of said plurality of combinations based on said performance level of each host device and said performance level of each storage device;
selecting a combination from one or more combinations comprising a certain host device based on said order of precedence of each of said one or more combinations, and allocating said selected combination to said certain host device;
receiving, by a storage virtual computer capable of accessing the storage device included in said allocated combination, an access request from said certain host device, and accessing said storage device included in said allocated combination in accordance with said received access request;

referring to communication path information expressing the length of a communication path between each of said plurality of host devices and each of said plurality of storage devices;

specifying, from said communication path information, a communication path length which corresponds to each of said plurality of combinations;

attaching an order of precedence to each of said plurality of combinations based on said performance level of each host device, said performance level of each storage device, and said specified communication path length of each combination;

attaching a priority value to each of said plurality of combinations based on said order of precedence of each of said plurality of combinations and a weighting value corresponding to said performance level; and selecting a combination from said one or more combinations comprising said certain host device based on said priority value of each of said one or more combinations, and allocating said selected combination to said certain host device, wherein said one or more storage control devices comprise a first storage control device and a second storage control device, wherein said plurality of storage devices comprises a first storage connected communicably to said first storage control device, and a second storage connected communicably to said second storage control device, wherein when a first storage virtual computer set in said first storage control device is capable of accessing a first logical volume set in said first storage, said first storage virtual computer is moved or copied into said second storage control device, and said first logical volume is moved or copied into said second storage, wherein, when a predetermined event occurs, said first storage virtual computer is moved or copied into said second storage control device, and said first logical volume is moved or copied into said second storage, in accordance with predetermined policy information, for each application of said first storage virtual computer, wherein said predetermined policy information expresses a policy relating to whether said first storage virtual computer is moved or copied into said second storage control device and whether said first logical volume is moved or copied into said second storage, and wherein said predetermined policy information comprises an indication of whether a disaster recovery service is to be applied, an indication of whether a copying service is to be applied, an indication of whether a clustering service is to be applied, and an indication of whether a storage service is to be applied.

2. The storage control method according to claim 1, comprising the steps of:

gathering host information elements, comprising an ID and said performance level of each host device, from each host device, and generating said host information based on said gathered host information elements; and gathering storage device information elements, comprising an ID and said performance level of each storage device, from each storage control device, and generating said storage device information based on said gathered storage device information elements.

3. The storage control method according to claim 1, comprising a plurality of host devices for accessing at least one of said plurality of storage devices, wherein said plurality of host devices comprises a first host device connected communicably to said first storage control device, and a second host device connected communicably to said second storage control device, said first host device comprises an information processing portion having at least one of a virtual computer allocated all or a part of the hardware resources of said first host device, and a computer program executed by said virtual computer, and when said information processing portion is capable of accessing said first logical volume prior to movement or copying via said first storage virtual computer prior to movement or copying, said information processing portion provided in said first host device is moved or copied into said second host device.

4. The storage control method according to claim 1, wherein at least one of said plurality of host devices for accessing at least one of said plurality of storage devices comprises an information processing portion having at least one of a virtual computer allocated to all or a part of the hardware resources of said host device, and a computer program executed by said virtual computer, wherein said storage devices comprise storage areas, and when said information processing portion is capable of accessing a logical volume set in a certain storage area via a certain storage virtual computer of a certain storage control device, said logical volume and said certain storage virtual computer are neither moved nor copied, but said information processing portion is moved or copied from the host device thereof to another host device.

5. A device capable of communicating with one or more storage control devices connected communicably to at least one of a plurality of storage devices, said device comprising:

a storage area storing at least one computer program; and at least one computer for reading at least one computer program from said storage area and executing said computer program, wherein said at least one computer:

refers to resource information relating to the usage condition of at least one hardware resource from among said one or more storage control devices;

specifies an unused part of said hardware resource from said resource information;

allocates a storage virtual computer, which serves as a virtual computer to which all or a part of said specified unused part is allocated, to at least one of said one or more storage control devices;

refers to host information, which is information expressing a performance level of each host device of a plurality of host devices, and referring to storage device information, which is information expressing a performance level of each storage device of said plurality of storage devices;

specifies a plurality of combinations of said host device and said storage device based on said performance level of each host device and said performance level of each storage device, specified from said host information and said storage device information;

attaches an order of precedence to each of said plurality of combinations based on said performance level of each host device and said performance level of each storage device;

selects a combination from one or more combinations comprising a certain host device based on said order of precedence of each of said one or more combinations, and allocates said selected combination to said certain host device;

receives, by a storage virtual computer capable of accessing the storage device included in said allocated combination, an access request from said certain host device, and accessing said storage device included in said allocated combination in accordance with said received access request;

refers to communication path information expressing the length of a communication path between each of said plurality of host devices and each of said plurality of storage devices;

specifies, from said communication path information, a communication path length which corresponds to each of said plurality of combinations;

attaches an order of precedence to each of said plurality of combinations based on said performance level of each host device, said performance level of each storage device, and said specified communication path length of each combination;

attaches a priority value to each of said plurality of combinations based on said order of precedence of each of said plurality of combinations and a weighting value corresponding to said performance level; and selects a combination from said one or more combinations comprising said certain host device based on said priority value of each of said one or more combinations, and allocates said selected combination to said certain host device, wherein said one or more storage control devices comprise a first storage control device and a second storage control device, wherein said plurality of storage devices comprises a first storage connected communicably to said first storage control device, and a second storage connected communicably to said second storage control device, wherein when a first storage virtual computer set in said first storage control device is capable of accessing a first logical volume set in said first storage, said first storage virtual computer is moved or copied into said second storage control device, and said first logical volume is moved or copied into said second storage, wherein, when a predetermined event occurs, said first storage virtual computer is moved or copied into said second storage control device, and said first logical volume is moved or copied into said second storage, in accordance with predetermined policy information, for each application of said first storage virtual computer, wherein said predetermined policy information expresses a policy relating to whether said first storage virtual computer is moved or copied into said second storage control device and whether said first logical volume is moved or copied into said second storage, and wherein said predetermined policy information comprises an indication of whether a disaster recovery service is to be applied, an indication of whether a copying service is to be applied, an indication of whether a clustering service is to be applied, and an indication of whether a storage service is to be applied.

6. A storage control system comprising:

one or more storage control devices connected communicably to at least one of a plurality of storage devices; and a management device connected communicably to said one or more storage control devices, said management device comprising:

a storage area storing at least one computer program; and at least one computer for reading at least one computer program from said storage area and executing said computer program, wherein said at least one computer:

refers to resource information relating to the usage condition of at least one hardware resource from among said one or more storage control devices;

specifies an unused part of said hardware resource from said resource information;

allocates a storage virtual computer, which serves as a virtual computer to which all or a part of said specified unused part is allocated, to at least one of said one or more storage control devices;

refers to host information, which is information expressing a performance level of each host device of a plurality of host devices, and referring to storage device information, which is information expressing a performance level of each storage device of said plurality of storage devices;

specifies a plurality of combinations of said host device and said storage device based on said performance level of each host device and said performance level of each storage device, specified from said host information and said storage device information;

attaches an order of precedence to each of said plurality of combinations based on said performance level of each host device and said performance level of each storage device;

selects a combination from one or more combinations comprising a certain host device based on said order of precedence of each of said one or more combinations, and allocates said selected combination to said certain host device;

receives, by a storage virtual computer capable of accessing the storage device included in said allocated combination, an access request from said certain host device, and accessing said storage device included in said allocated combination in accordance with said received access request;

refers to communication path information expressing the length of a communication path between each of said plurality of host devices and each of said plurality of storage devices;

specifies, from said communication path information, a communication path length which corresponds to each of said plurality of combinations;

attaches an order of precedence to each of said plurality of combinations based on said performance level of each host device, said performance level of each storage device, and said specified communication path length of each combination;

attaches a priority value to each of said plurality of combinations based on said order of precedence of each of said plurality of combinations and a weighting value corresponding to said performance level; and selects a combination from said one or more combinations comprising said certain host device based on said priority value of each of said one or more combinations, and allocates said selected combination to said certain host device, wherein said one or more storage control devices comprise a first storage control device and a second storage control device, wherein said plurality of storage devices comprises a first storage connected communicably to said first storage control device, and a second storage connected communicably to said second storage control device, wherein when a first storage virtual computer set in said first storage control device is capable of accessing a first logical volume set in said first storage, said first storage virtual computer is moved or copied into said second storage control device, and said first logical volume is moved or copied into said second storage, wherein, when a predetermined event occurs, said first storage virtual computer is moved or copied into said second storage control device, and said first logical volume is moved or copied into said second storage, in accordance with predetermined policy information, for each application of said first storage virtual computer, wherein said predetermined policy information expresses a policy relating to whether said first storage virtual computer is moved or copied into said second storage control device and whether said first logical volume is moved or copied into said second storage, and wherein said predetermined policy information comprises an indication of whether a disaster recovery service is to be applied, an indication of whether a copying service is to be applied, an indication of whether a clustering service is to be applied, and an indication of whether a storage service is to be applied.

7. A computer program tangibly embodied on a computer-readable storage medium, wherein said computer program causes a computer to execute the steps of:

referring to resource information relating to the usage condition of at least one hardware resource from among one or more storage control devices connected communicably to at least one of a plurality of storage devices;

specifying an unused part of said hardware resource from said resource information;

allocating a storage virtual computer, which serves as a virtual computer to which all or a part of said specified unused part is allocated, to at least one of said one or more storage control devices;

referring to host information, which is information expressing a performance level of each host device of a plurality of host devices, and referring to storage device information, which is information expressing a performance level of each storage device of said plurality of storage devices;

specifying a plurality of combinations of said host device and said storage device based on said performance level of each host device and said performance level of each storage device, specified from said host information and said storage device information;

attaching an order of precedence to each of said plurality of combinations based on said performance level of each host device and said performance level of each storage device;

selecting a combination from one or more combinations comprising a certain host device based on said order of precedence of each of said one or more combinations, and allocating said selected combination to said certain host device;

receiving, by a storage virtual computer capable of accessing the storage device included in said allocated combination, an access request from said certain host device, and accessing said storage device included in said allocated combination in accordance with said received access request;

referring to communication path information expressing the length of a communication path between each of said plurality of host devices and each of said plurality of storage devices;

specifying, from said communication path information, a communication path length which corresponds to each of said plurality of combinations;

attaching an order of precedence to each of said plurality of combinations based on said performance level of each host device, said performance level of each storage device, and said specified communication path length of each combination;

attaching a priority value to each of said plurality of combinations based on said order of precedence of each of said plurality of combinations and a weighting value corresponding to said performance level; and selecting a combination from said one or more combinations comprising said certain host device based on said priority value of each of said one or more combinations, and allocating said selected combination to said certain host device, wherein said one or more storage control devices comprise a first storage control device and a second storage control device, wherein said plurality of storage devices comprises a first storage connected communicably to said first storage control device, and a second storage connected communicably to said second storage control device, wherein when a first storage virtual computer set in said first storage control device is capable of accessing a first logical volume set in said first storage, said first storage virtual computer is moved or copied into said second storage control device, and said first logical volume is moved or copied into said second storage, wherein, when a predetermined event occurs, said first storage virtual computer is moved or copied into said second storage control device, and said first logical volume is moved or copied into said second storage, in accordance with predetermined policy information, for each application of said first storage virtual computer, wherein said predetermined policy information expresses a policy relating to whether said first storage virtual computer is moved or copied into said second storage control device and whether said first logical volume is moved or copied into said second storage, and wherein said predetermined policy information comprises an indication of whether a disaster recovery service is to be applied, an indication of whether a copying service is to be applied, an indication of whether a clustering service is to be applied, and an indication of whether a storage service is to be applied.

* * * * *